(12) United States Patent
Watarai et al.

(10) Patent No.: US 9,963,197 B2
(45) Date of Patent: May 8, 2018

(54) ELECTRIC BICYCLE REAR DERAILLEUR

(71) Applicant: Shimano Inc., Sakai, Osaka (JP)

(72) Inventors: Etsuyoshi Watarai, Osaka (JP); Atsushi Komatsu, Osaka (JP); Yuta Kurokawa, Osaka (JP); Shingo Sakurai, Osaka (JP)

(73) Assignee: Shimano Inc., Osaka (JP)

( * ) Notice: Subject to any disclaimer, the term of this patent is extended or adjusted under 35 U.S.C. 154(b) by 118 days.

(21) Appl. No.: 14/922,731

(22) Filed: Oct. 26, 2015

(65) Prior Publication Data

US 2017/0113759 A1    Apr. 27, 2017

(51) Int. Cl.
*B62M 9/122* (2010.01)

(52) U.S. Cl.
CPC .................. *B62M 9/122* (2013.01)

(58) Field of Classification Search
CPC ...................................... B62M 9/122
See application file for complete search history.

(56) References Cited

U.S. PATENT DOCUMENTS

| | | | |
|---|---|---|---|
| 2012/0322594 A1* | 12/2012 | Kitamura | B62J 6/06 474/110 |
| 2014/0087901 A1* | 3/2014 | Shipman | B62M 9/132 474/82 |
| 2015/0111675 A1* | 4/2015 | Shipman | B62M 9/122 474/82 |
| 2016/0052594 A1* | 2/2016 | Kimmich | B62M 9/122 701/22 |
| 2016/0221640 A1* | 8/2016 | Watarai | B62M 25/08 |
| 2017/0012455 A1* | 1/2017 | Kato | B62M 9/122 |

FOREIGN PATENT DOCUMENTS

CN          102826190 A     12/2012

* cited by examiner

*Primary Examiner* — William E Dondero
*Assistant Examiner* — Robert T Reese
(74) *Attorney, Agent, or Firm* — Global IP Counselors, LLP

(57) ABSTRACT

An electric bicycle rear derailleur is basically provided with a base member, a chain guide, a linkage assembly and a battery bracket. The chain guide is pivotally supported with respect to the base member between a retracted position and an extended position. The linkage assembly operatively couples the chain guide to the base member. The battery bracket is supported as a separate part on the base member. The battery bracket configured to receive a battery.

26 Claims, 28 Drawing Sheets

ELECTRIC BICYCLE REAR DERAILLEUR

BACKGROUND

Field of the Invention

This invention generally relates to an electric bicycle rear derailleur and a battery bracket for an electric bicycle rear derailleur.

Background Information

In recent years, some bicycles are provided with electrical components or devices to make it easier for the rider to operate the bicycle. Examples of such bicycle electrical components include suspensions, transmission devices (e.g., derailleurs, internally geared hubs, etc.) and seatposts. Such bicycle electrical components require electricity from a power source, such as a wheel hub generator and/or a battery. Typically, the power source is mounted remotely from the electrical components. As a result, electrical wires are routed along the bicycle frame between the electrical components and the battery. Also these bicycle electrical components can be interconnected to communicate with electrical wires or through wireless communications. Wireless bicycle electrical components are advantageous in that electrical wires connecting bicycle electrical components to each other can be omitted.

SUMMARY

Generally, the present disclosure is directed to various features of an electric bicycle rear derailleur for a bicycle and to a battery bracket for an electric bicycle rear derailleur.

In view of the state of the known technology and in accordance with a first aspect of the present disclosure, an electric bicycle rear derailleur is basically provided that comprises a base member, a chain guide, a linkage assembly and a battery bracket. The chain guide is pivotally supported with respect to the base member between a retracted position and an extended position. The linkage assembly operatively couples the chain guide to the base member. The battery bracket is supported as a separate part on the base member. The battery bracket configured to receive a battery.

In accordance with a second aspect of the present invention, the electric bicycle rear derailleur according to the first aspect further comprises the battery mounted on the battery bracket.

In accordance with a third aspect of the present invention, the electric bicycle rear derailleur according to the first aspect is configured so that the battery bracket is detachably and reattachably coupled to the base member.

In accordance with a fourth aspect of the present invention, the electric bicycle rear derailleur according to the first aspect is configured so that the battery bracket extends from a frame facing side of the base member, and supports the battery at a position with the battery disposed primarily rearward of the base member while the electric bicycle rear derailleur is mounted to a bicycle frame.

In accordance with a fifth aspect of the present invention, the electric bicycle rear derailleur according to the fourth aspect is configured so that the battery bracket further supports the battery primarily below the base member while the electric bicycle rear derailleur is mounted to a bicycle frame.

In accordance with a sixth aspect of the present invention, the electric bicycle rear derailleur according to the first aspect is configured so that the battery bracket extends from a frame facing side of the base member, and supports the battery at a position with the battery disposed primarily forward of the base member while the electric bicycle rear derailleur is mounted to a bicycle frame.

In accordance with a seventh aspect of the present invention, the electric bicycle rear derailleur according to the sixth aspect is configured so that the battery bracket further supports the battery primarily above the base member while the electric bicycle rear derailleur is mounted to a bicycle frame.

In accordance with an eighth aspect of the present invention, the electric bicycle rear derailleur according to the fourth aspect is configured so that the base member includes a frame mounting structure that is configured to be attached to the bicycle frame and attaches the battery bracket to the base member.

In accordance with a ninth aspect of the present invention, the electric bicycle rear derailleur according to the first aspect further comprises a derailleur bracket including a first attachment portion mounted to the base member, and a second attachment portion configured to be mounted to a bicycle frame.

In accordance with a tenth aspect of the present invention, the electric bicycle rear derailleur according to the ninth aspect is configured so that the battery bracket is disposed on the second attachment portion of the derailleur bracket.

In accordance with an eleventh aspect of the present invention, the electric bicycle rear derailleur according to the ninth aspect is configured so that the battery bracket is disposed on the first attachment portion of the derailleur bracket.

In accordance with a twelfth aspect of the present invention, the electric bicycle rear derailleur according to the first aspect is configured so that the battery bracket extends from a side opposite to a frame facing side of the base member, and supports the battery at a position with the battery disposed primarily rearward of the base member while the electric bicycle rear derailleur is mounted to a bicycle frame.

In accordance with a thirteenth aspect of the present invention, the electric bicycle rear derailleur according to the twelfth aspect is configured so that the battery bracket further supports the battery primarily below the base member while the electric bicycle rear derailleur is mounted to a bicycle frame.

In accordance with a fourteenth aspect of the present invention, the electric bicycle rear derailleur according to the twelfth aspect is configured so that the base member includes a frame mounting structure that is configured to be attached to the bicycle frame and attaches the battery bracket to the base member.

In accordance with a fifteenth aspect of the present invention, the electric bicycle rear derailleur according to the twelfth aspect further comprises a derailleur bracket including a first attachment portion mounted to the base member, and a second attachment portion configured to be mounted to a bicycle frame.

In accordance with a sixteenth aspect of the present invention, the electric bicycle rear derailleur according to the first aspect is configured so that the battery bracket extends from a side opposite to a frame facing side of the base member, and supports the battery at a position with the battery disposed primarily forward of the base member while the electric bicycle rear derailleur is mounted to a bicycle frame, In accordance with a seventeenth aspect of the present invention, the electric bicycle rear derailleur according to the sixteenth aspect is configured so that the battery bracket further supports the battery primarily above the base member while the electric bicycle rear derailleur is mounted to a bicycle frame.

In accordance with an eighteenth aspect of the present invention, the electric bicycle rear derailleur according to the sixteenth aspect is configured so that the base member includes a frame mounting structure that is configured to be attached to the bicycle frame and attaches the battery bracket to the base member.

In accordance with a nineteenth aspect of the present invention, the electric bicycle rear derailleur according to the sixteenth aspect is configured so that further comprises a derailleur bracket including a first attachment portion mounted to the base member, and a second attachment portion configured to be mounted to a bicycle frame.

In accordance with a twentieth aspect of the present invention, the electric bicycle rear derailleur according to the first aspect further comprises an electric motor unit disposed on the base member.

In accordance with a twenty-first aspect of the present invention, the electric bicycle rear derailleur according to the twentieth aspect is configured so that the battery is electrically connected to the electric motor unit by an electrical wire.

In accordance with a twenty-second aspect of the present invention, the electric bicycle rear derailleur according to the twenty-first is configured so that the electrical wire extends directly between the electric motor unit and the battery bracket.

In accordance with a twenty-third aspect of the present invention, the electric bicycle rear derailleur according to the twenty-first aspect is configured so that the electrical wire includes a wire terminal that mounted on the battery bracket and the battery includes a plug-in terminal that mates with the wire terminal.

In accordance with a twenty-fourth aspect of the present invention, the electric bicycle rear derailleur according to the first aspect is configured so that the battery bracket includes a mounting part, a battery receiving part and an arm part. The mounting part is configured to be attached to the base member. The battery receiving part is configured to receive the battery. The arm part is configured to connect the mounting part and the battery receiving part.

In accordance with a twenty-fifth aspect of the present invention, the electric bicycle rear derailleur according to the twenty-fourth aspect is configured so that the arm part of the battery bracket is configured to maintain a relative position of the battery receiving part to the mounting part.

In accordance with a twenty-sixth aspect of the present invention, the electric bicycle rear derailleur according to the twenty-fourth aspect is configured so that the arm part of the battery bracket includes a plurality of ball and socket joint connectors, the arm part configured to flexibly maintain a relative position of the battery receiving part to the mounting part.

In accordance with a twenty-seventh aspect of the present invention, a battery bracket is provided that basically comprises a first mounting portion and a second mounting portion. The first mounting portion is configured to be detachably and reattachably mounted to one of a bicycle frame, a derailleur bracket, and a base member. The second mounting portion is configured to support a battery at a position with the battery disposed primarily rearward of the base member while the base member is mounted to the bicycle frame.

In accordance with a twenty-seventh aspect of the present invention, the electric bicycle rear derailleur according to the first aspect is configured so that the second mounting portion is further configured to support the battery at a position disposed primarily below the base member while the electric bicycle rear derailleur is mounted to the bicycle frame.

In accordance with a twenty-ninth aspect of the present invention, a battery bracket is provided that basically comprises a first mounting portion and a second mounting portion. The first mounting portion is configured to be detachably and reattachably mounted to one of a bicycle frame, a derailleur bracket, and a base member. The second mounting portion is configured to support a battery at a position with the battery disposed primarily forward of the base member while the base member is mounted to the bicycle frame.

In accordance with a thirtieth aspect of the present invention, the electric bicycle rear derailleur according to the twenty-ninth aspect is configured so that the second mounting portion is further configured to support the battery at a position disposed primarily above the base member while the electric bicycle rear derailleur is mounted to the bicycle frame.

Also other Objects, features, aspects and advantages of the disclosed electric bicycle rear derailleur will become apparent to those skilled in the art from the following detailed description, which, taken in conjunction with the annexed drawings, discloses one embodiment of the electric bicycle rear derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
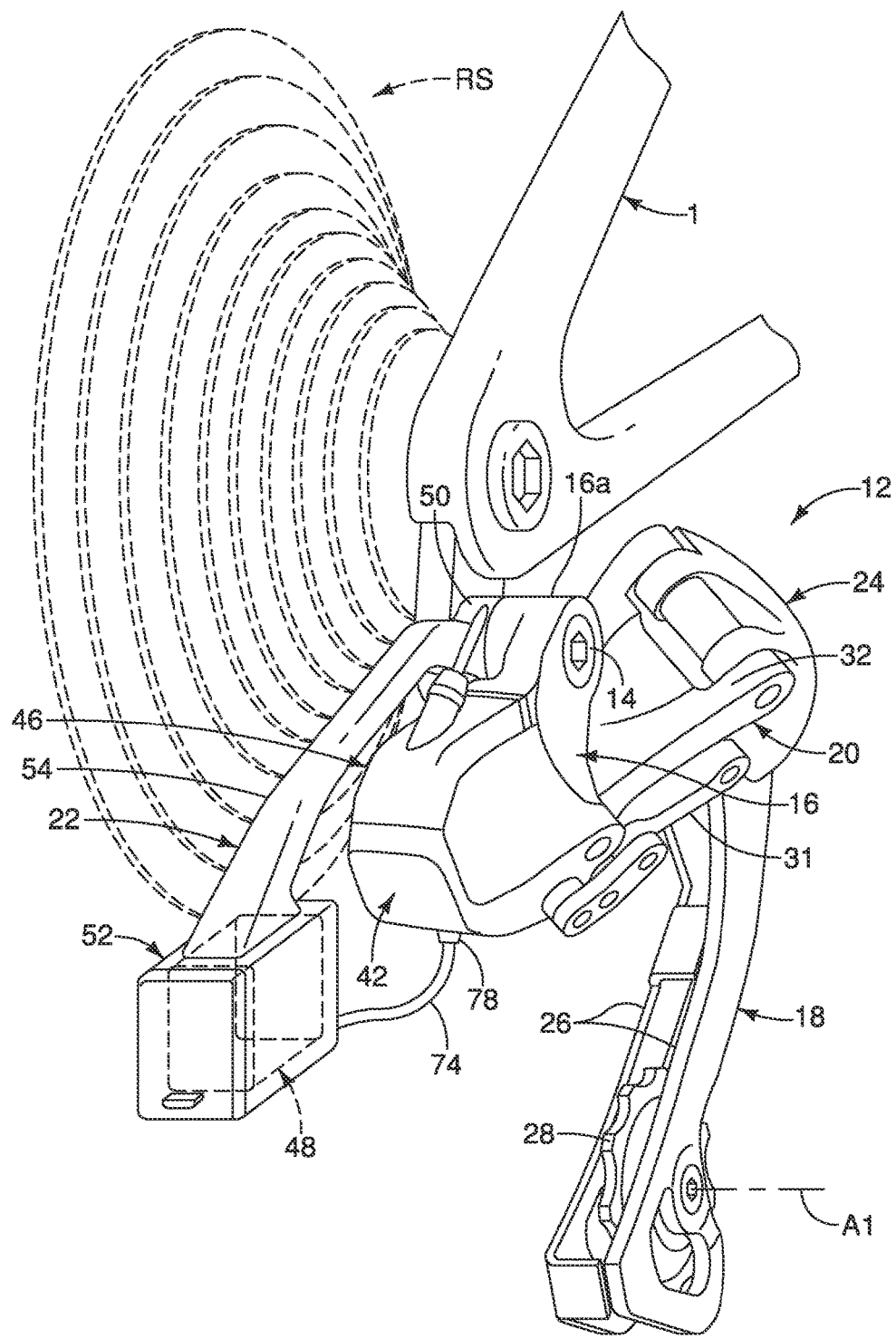
FIG. 1 is a rear perspective of a portion of a bicycle frame that is equipped with an electric bicycle rear derailleur in accordance with a first illustrated embodiment in which the rear derailleur has a battery mounted to the rear derailleur via a battery bracket that supports the battery in a location that is primarily rearward and primarily below a base member of the rear derailleur while the rear derailleur is mounted to the bicycle frame.
Figure 2:
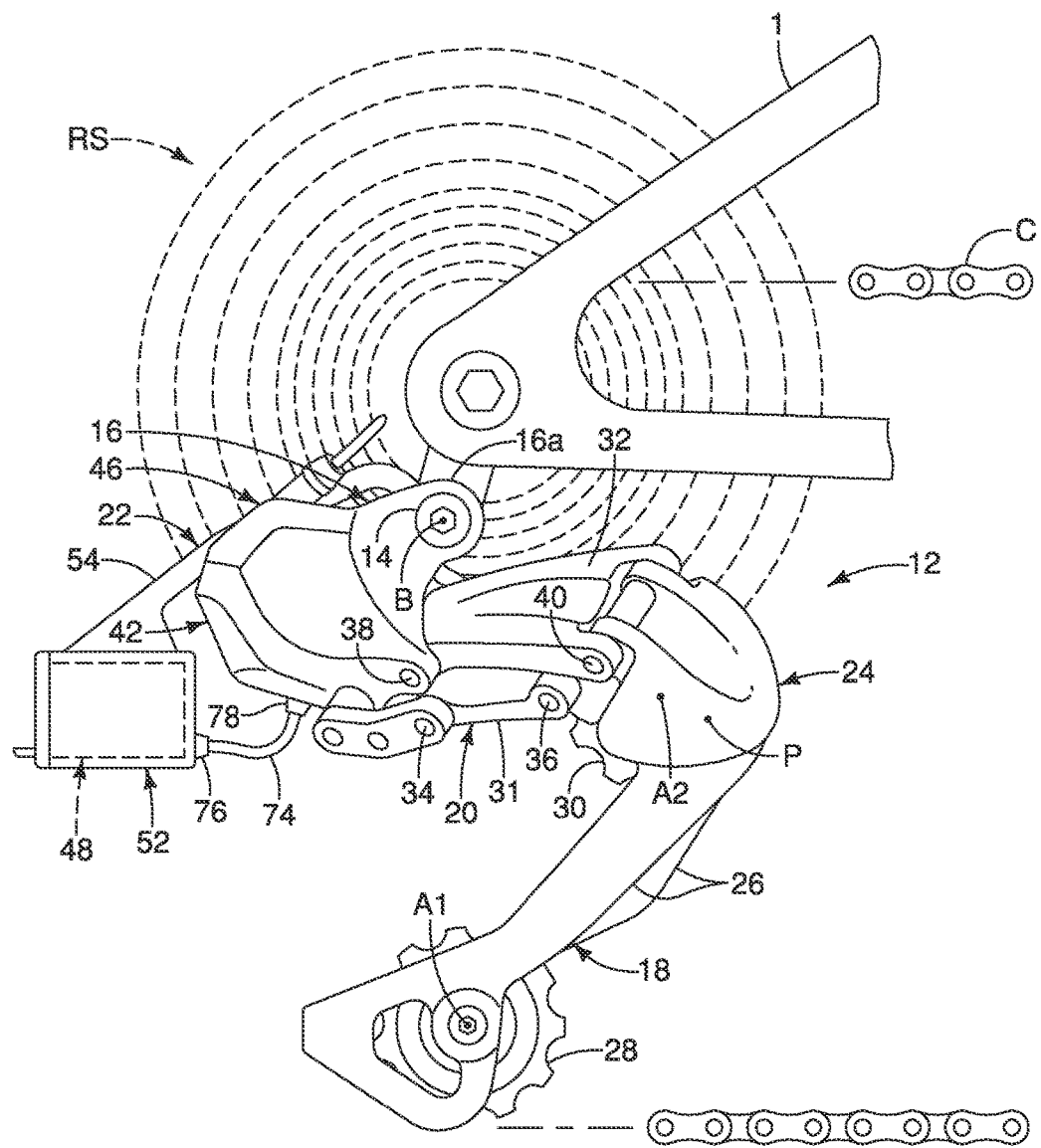
FIG. 2 is an outside elevational view of the portion of the bicycle frame and the rear derailleur illustrated in FIG. 1, with the battery bracket supporting the battery in a location that is primarily rearward and primarily below the base member of the rear derailleur while the rear derailleur is mounted to the bicycle frame.
Figure 3:
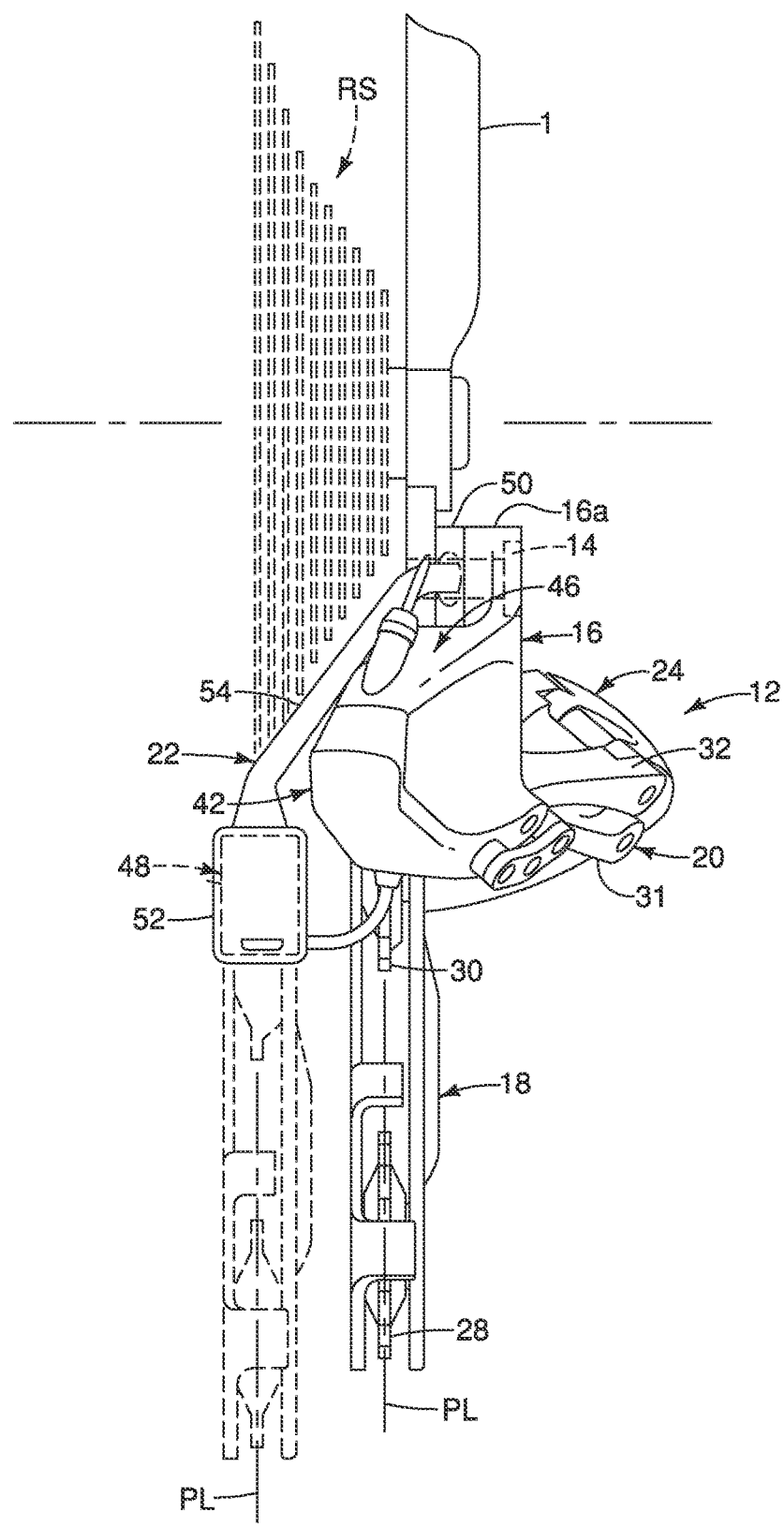
FIG. 3 is a rear elevational view of the portion of the bicycle frame and the rear derailleur illustrated in FIGS. 1 and 2, with the battery bracket supporting the battery in a location that is primarily rearward and primarily below the base member of the rear derailleur while the rear derailleur is mounted to the bicycle frame.

Referring initially to FIGS. 1 to 3, a portion of a bicycle frame 1 is illustrated that is equipped with an electric bicycle rear derailleur 12 in accordance with a first embodiment. The electric bicycle rear derailleur 12 is mounted to the bicycle frame 1 of the bicycle via a fixing bolt 14. A rear wheel (not shown) having a rear sprocket cassette RS is rotatably supported on the bicycle frame 1 in a conventional manner. The electric bicycle rear derailleur 12 is configured to shift a chain C in a lateral direction with respect to a vertical center plane of the bicycle frame 1.

In the first embodiment, the electric bicycle rear derailleur 12 basically comprises a base member 16, a chain guide 18, a linkage assembly 20 and a battery bracket 22. The base member 16 includes a mounting portion 16a that rotatably retains the fixing bolt 14 to the base member 16 in a conventional manner. Thus, the base member 16 includes a frame mounting structure (i.e., the fixing bolt 14 rotatably retained on the mounting portion 16a) that is configured to be attached to the bicycle frame 1 and attaches the battery bracket 22 to the base member 16. The fixing bolt 14 is apart of the mounting portion 16a in that the fixing bolt 14 is rotatably to the mounting portion 164 while the fixing bolt 14 is not attached to the bicycle frame 1 and/or the battery bracket 22. In other words, the battery bracket 22 is supported as a separate part on the base member 16 via the fixing bolt 14 so as to be removable and reinstalled without damaging the electric bicycle rear derailleur 12 and/or the battery bracket 22 using the fixing bolt 14. In this way, the battery bracket 22 is detachably and reattachably coupled to the base member 16 via the fixing bolt 14. As a result of the battery bracket 22 being detachably and reattachably, the battery bracket 22 can be replaced if damaged without having to replace the electric bicycle rear derailleur 12. Moreover, the battery bracket 22 can be removed and the electric bicycle rear derailleur 12 can be connected to a remote battery, In other words, the battery bracket 22 is supported as a separate part on the base member 16.

The base member 16 is preferably constructed of a rigid material such as a lightweight metal (e.g., an aluminum alloy or a fiber reinforced plastic). Preferably, the base member 16 is pivotally mounted on the fixing bolt 14 about a pivot axis B that is defined by the center longitudinal axis of the fixing bolt 14. Here, the fixing bolt 14 of the base member 16 forms a mounting portion 16a that is configured to be attached to the bicycle frame 1 and attaches the battery bracket 22 to the base member 16. The mounting portion 16a has an opening for receiving the fixing bolt 14 therethrough. The pivot axis B is sometimes called the B-axis of the rear derailleur. The mounting portion 16a can also include a biasing member therein for controlling the movement of the base member 16 about the B-axis in a conventional manner, Also the base member 16 pivotally supports one end of the linkage assembly 20.

The chain guide 18 is coupled to the linkage assembly 20 by a movable member 24, which is constructed a suitable rigid material such as an aluminum alloy or a fiber reinforced plastic. In particular, the chain guide 18 is pivotally mounted to the movable member 24 by an axle (not shown) to pivot about a chain guide pivot axis P, which is sometimes called the P-axis of the rear derailleur. The chain guide 18 basically includes a pair of chain cage plates 26, a tension pulley 28 and a guide pulley 30. The parts of the chain guide 18 are constructed suitable rigid materials such as an aluminum alloy and/or a fiber reinforced plastic. The pulleys 28 and 30 are both rotatably disposed between the chain cage plates 26. The tension (first) pulley 28 rotates around a first pulley axis A1 in a center pulley plane PL that bisects the tension (first) pulley 28. The guide (second) pulley 30 rotates around a second pulley axis A2 in the center pulley plane PL that bisects the guide (second) pulley 30. Thus, in this illustrated embodiment, the pulleys 28 and 30 have the same center pulley plane PL.

Now the linkage assembly 20 will now be discussed in more detail. The linkage assembly 20 operatively couples the chain guide 18 to the base member 16. In the illustrated embodiment, the linkage assembly 20 includes a first or inner link 31 and a second or outer link 32. The inner and outer links 31 and 32 are constructed a suitable rigid material such as an aluminum alloy or a fiber reinforced plastic. The linkage assembly 20 preferably further includes a biasing member (not shown) that is interposed between the inner and outer links 31 and 32 to bias the movable member 24 towards one of a low shift stage position and a top shift stage position. The inner link 31 is pivotally connected to the base member 16 and the movable member 24. The outer link 32 is pivotally connected to the base member 16 and the movable member 24. The inner link 31 has a first end that is pivotally connected to the base member 16 by a pivot pin 34. The inner link 31 has a second end that is pivotally connected to the movable member 24 by a pivot pin 36. The outer link 32 has a first end that is pivotally connected to the base member 16 by a pivot pin 38. The outer link 32 has a second end that is pivotally connected to the movable member 24 by a pivot pin 40. Thus, the inner and outer links 31 and 32 have first ends pivotally connected to the base member 16 and second ends pivotally connected to the movable member 24 to define a four bar linkage arrangement.

As seen in FIG. 3, the chain guide 18 is pivotally supported with respect to the base member 16 between a retracted position (shown in broken lines) and an extended position (shown in full lines) by the linkage assembly 20. Since the electric bicycle rear derailleur 12 is used with a rear sprocket cassette that has ten sprockets, the chain guide 18 can move to a plurality of retracted positions respect to the fully extended position shown in full lines in FIG. 3. Of course, the chain guide 18 can be considered to have a plurality of extended positions with respect to the fully retracted position of the chain guide 18, which corresponds to when the pulleys 28 and 30 of the chain guide 18 are aligned with the largest rear sprocket.

The electric motor unit 42 is operatively coupled to the linkage assembly 20 to move the chain guide 18 with respect to the base member 16. In the first embodiment, the pivot pin 34 is also the output shaft. of the electric motor unit 42. In this way, rotation of the pivot pin 34 of the electric motor unit 42 pivots the linkage assembly 20 to move the chain guide 18 with respect to the base member 16. Since derailleurs with electric motor units are known in the bicycle field, the electric motor unit 42 and its connection to the linkage assembly 20 will not be discussed and/or illustrated in detail herein.

Preferably, the electric bicycle rear derailleur 12 further comprises a wireless communications unit 46. The wireless communications unit 46 is disposed on the base member 16. The wireless communications unit 46 is a two-way wireless communication unit that conducts two-way wireless communications using a wireless receiver for wirelessly receiving shift signals and a wireless transmitter for wirelessly transmitting data. in the present embodiment, the wireless communications unit 46 can wirelessly communicate with other devices, such as a smart-phone or a personal computer, for updating firmware stored in memory of the wireless communications unit 46, for example.

The wireless control signals of the wireless communications unit 46 can be radio frequency (RF) signals or any other type of signal suitable for wireless communications as used in the bicycle field, it should also be understood that the wireless communications unit 46 can transmit the signals at a particular frequency and/or with an identifier such as a particular code, to distinguish the wireless control signal from other wireless control signals. In this way, the electric bicycle rear derailleur 12 can recognize which control signals are to be acted upon and which control signals are not to be acted upon. Thus, the electric bicycle rear derailleur 12 can ignore the control signals from other wireless communications units.

Figure 4:
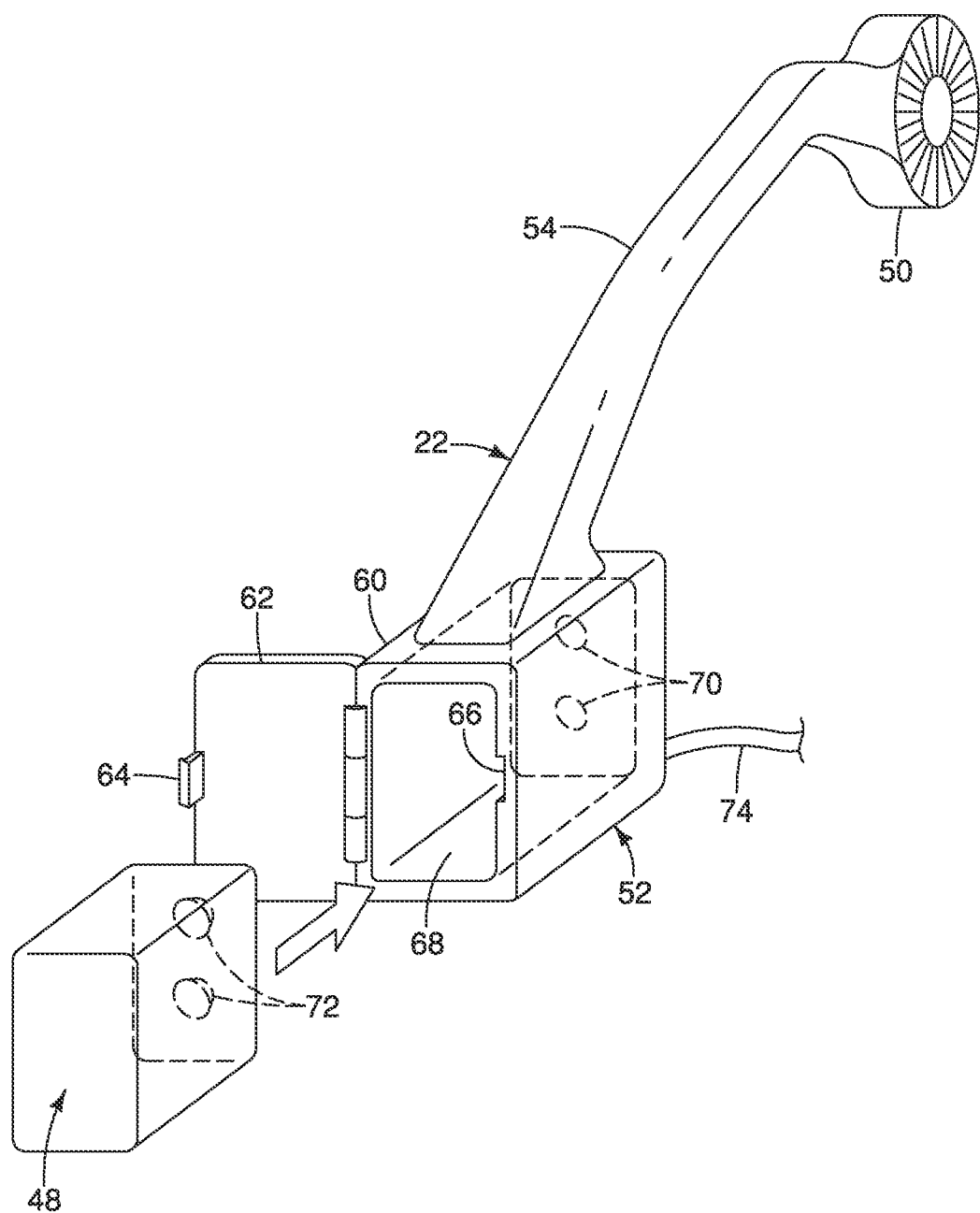
FIG. 4 is an enlarged, rear perspective view of the battery bracket, illustrated in FIGS. 1 to 3 with the battery exploded out from the battery bracket.
Figure 5:
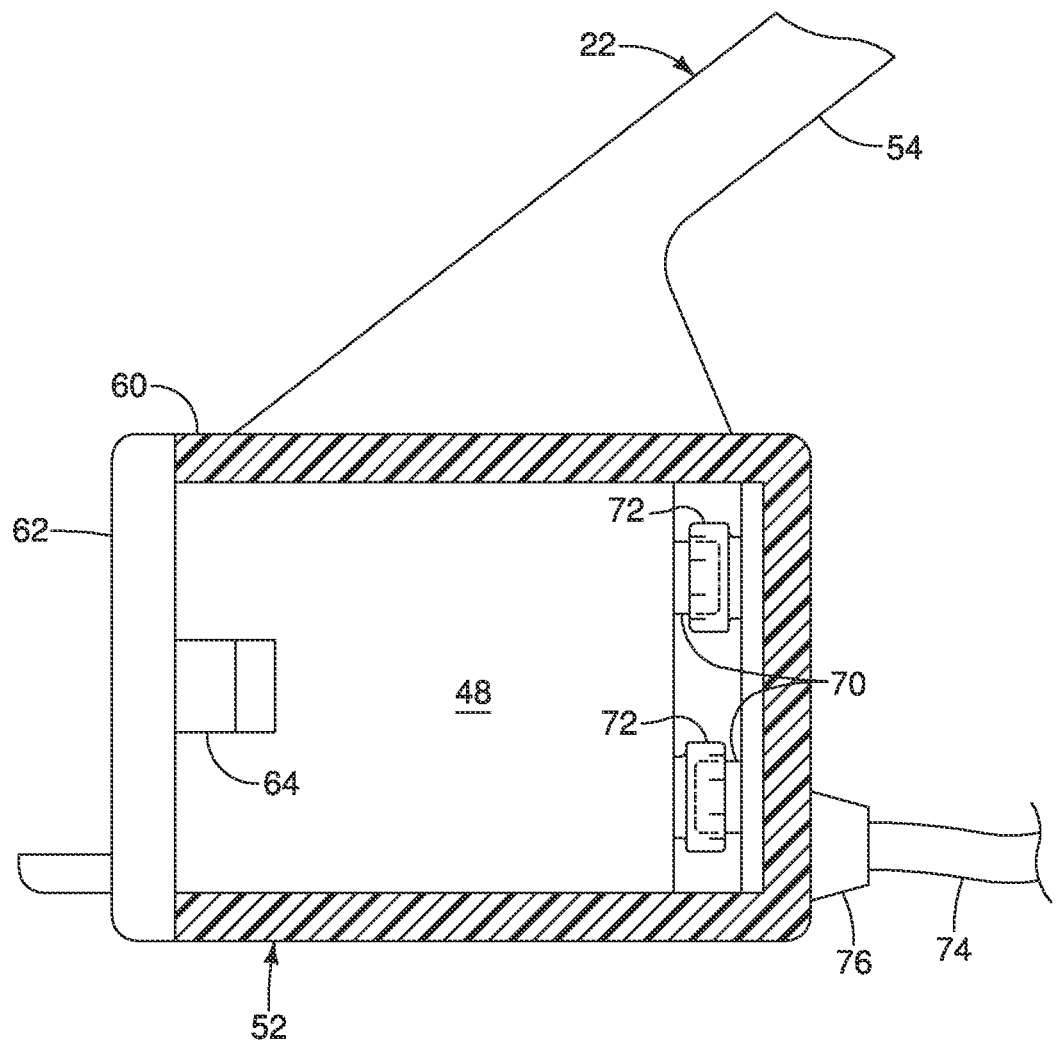
FIG. 5 is an enlarged, partial elevational view of the battery bracket illustrated in FIGS. 1 to 3, with a portion of the battery bracket broken away to show the battery inside the battery bracket.

Referring to FIGS. 4 and 5, the battery bracket 22 will now be discussed in more detail. The battery bracket 22 configured to receive a battery 48. Preferably, the battery 48 is removable from the battery bracket 22 so that the battery 48 can be recharged or replaced. Thus, the battery 48 is mounted on the battery bracket 22. The battery 48 can be any suitable electrical power source such as a rechargeable electrical battery, a disposable electrical battery, a fuel cell battery, etc.

The battery bracket 22 extends from a frame facing side of the base member 16. in particular, the battery bracket 22 is mounted on a frame facing side of the mounting portion 16a. The battery bracket 22 includes a mounting part 50, a battery receiving part 52 and an arm part 54. The mounting part 50, the battery receiving part 52 and the arm part 54 are preferably constructed of suitable rigid materials such as an aluminum alloy or a fiber reinforced plastic. The mounting part 50 of the battery bracket 22 constitutes a first mounting portion, while the battery receiving part 52 and the arm part 54 constitutes a second mounting portion. Thus, the battery bracket 22 comprises a first mounting portion and a second mounting portion.

As seen in FIG. 3, while the chain guide 18 is in one of the retracted portions corresponding to the chain C being engaged with one of the three largest sprockets of the rear sprocket cassette RS, the center pulley plane PL intersects with the battery bracket 22 and the battery 48. More specifically, the center pulley plane PL intersects with the battery receiving part 52 of the battery bracket 22, while the chain guide 18 is in one of the retracted portions in which the chain C is engaged with one of the three largest sprockets of the rear sprocket cassette RS. Here, the center pulley plane PL bisects. Thus, the center pulley plane PL bisects the battery receiving part 52 while the chain C is engaged with the largest sprocket of the rear sprocket cassette RS. Of course, depending on the configuration of the rear sprocket cassette RS, the center pulley plane PL will intersect with the battery receiving part 52 and the battery 48 while the chain guide 18 is in at least one of the retracted portions.

In this first embodiment, the mounting part 50 (i.e., the first mounting portion) is configured to be attached to the base member 16 via the fixing bolt 14. The mounting part 50 is located on the frame facing side of the mounting portion 16a of the base member 16. However, it will be apparent from this disclosure that, depending on the configuration of the rear derailleur, the mounting part 50 (i.e., the first mounting portion) is configured to be detachably and reattachably mounted to one of a bicycle frame, a derailleur bracket and a base member. The battery receiving part 52 is configured to receive the battery 48. The arm part 54 is configured to connect the mounting part 50 and the battery receiving part 52. The arm part 54 of the battery bracket 22 is configured to maintain a relative position of the battery receiving part 52 to the mounting part 50.

The battery receiving part 52 and the arm part 54 (i.e., the second mounting portion) are configured to support the battery 48 at a position with the battery 48 being disposed primarily rearward of the base member 16 while the base member 16 is mounted to the bicycle frame 1. The term "primarily rearward" as used herein means being disposed more than fifty percent rearward. In other words, the battery 48 is disposed such that more than fifty percent of the battery 48 is rearward of the base member 16. Also the battery receiving part 52 and the arm part 54 (i.e., the second mounting portion) is further configured to support the battery 48 at a position disposed primarily below the base member 16 while the electric bicycle rear derailleur 12 is mounted to the bicycle frame 1. The term "primarily below" as used herein means being disposed more than fifty percent below. In other words, the battery 48 is disposed such that more than fifty percent of battery 48 is below the base member 16.

The battery receiving part 52 includes a housing 60 and a cover 62. The cover 62 is hinged to the housing 60. The cover 62 includes a latch 64 that engages a notch 66 of the housing 60. The housing 60 has a cavity 68 that is dimension for receiving the battery 48. Here, an electrical wire 74 includes a pair of wire terminals 70 that is mounted on the battery bracket 22. The battery 48 includes a pair of plug-in terminals 72 mates with the wire terminals 70. For example, the plug-in terminals 72 of the battery 48 can be similar to a standard 9V battery having snap connector terminals that plugs into the wire terminals 70.

Thus, the electrical contacts or terminals 70 form a first electrical interface, while the electrical contacts or terminals 72 form a second electrical interface. However, the first and second electrical interfaces can be any suitable electrical interfaces that electrically transmit electrical power therebetween. For example, the first and second interfaces can be contactless electrical connectors in which the metal electrical contacts of the mating electrical connectors do not create physically electrical connection for contactless power (contactless connectivity).

The battery 48 is electrically connected to the electric motor unit 42 by an electrical wire 74. The electrical wire extends directly between the electric motor unit 42 and the battery bracket 22. In particular, the electrical wire 74 has a first electrical connector 76 that plugs into an electrical port of the housing 60 and a second connector 78 that plugs into the electric motor unit 42. The electrical contacts 70 of the housing 60 are thus electrically connected to electrical conductors of the electrical wire 74. Alternatively, the electrical wire 74 can be electrically connected in a non-releasable manner to both the electrical contacts 70 of the housing 60 and the electrical contacts 70 of the electric motor unit 42.

Figure 6:
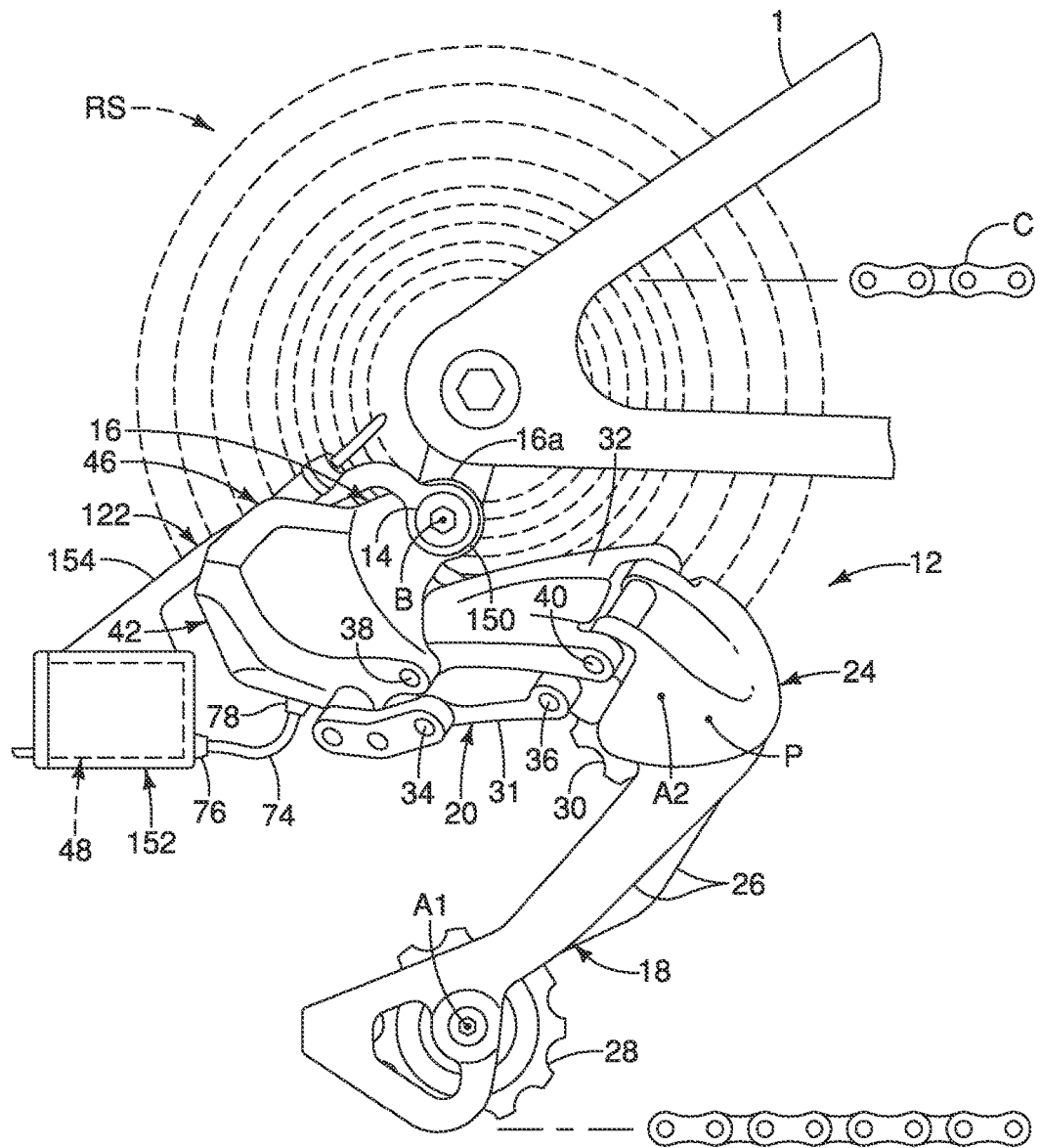
FIG. 6 is an outside elevational view of the portion of the bicycle frame and the rear derailleur illustrated in FIG. 1, but with a first alternative battery bracket supporting the battery in a location that is primarily rearward and primarily below the base member of the rear derailleur while the rear derailleur is mounted to the bicycle frame.
Figure 7:
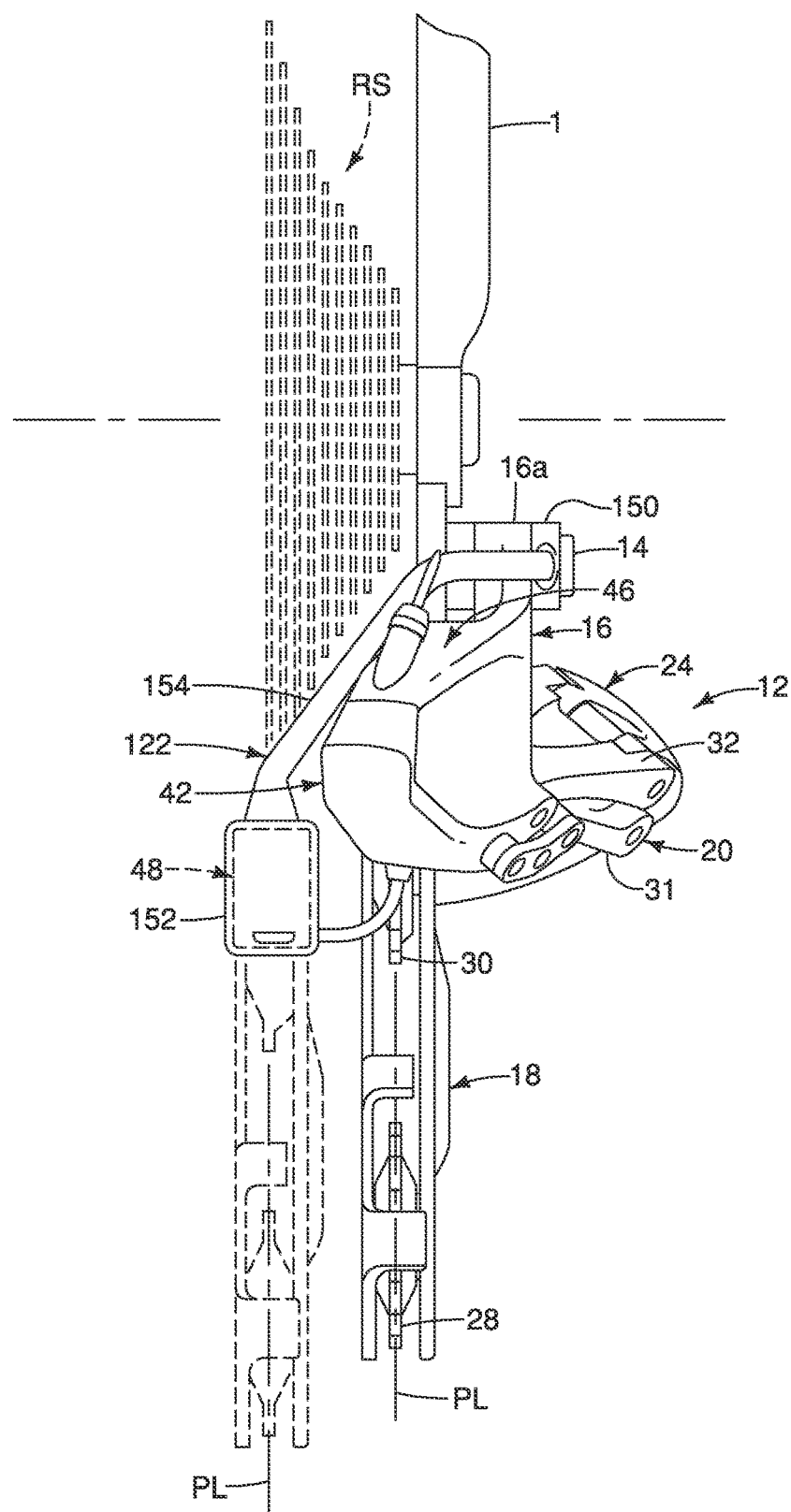
FIG. 7 is a rear elevational view of the portion of the bicycle frame and the rear derailleur illustrated in FIG. 6, with the first alternative battery bracket supporting the battery in a location that is primarily rearward and primarily below the base member of the rear derailleur while the rear derailleur is mounted to the bicycle frame.

Turning now to FIGS. 6 and 7, a first alternative battery bracket 122 will now be discussed that is used with the electric bicycle rear derailleur 12. The battery bracket 122 includes a mounting part 150, a battery receiving part 152 and an arm part 154. Here, the battery bracket 122 is identical to the battery bracket 22, except that the configuration of the arm part 154 has been modified so that, the mounting part 150 is mounted on a non-frame facing side of the mounting portion 16a of the base member 16 while the base member 16 is mounted to the bicycle frame 1 by the fastener 14.

The mounting part 150 (i.e., the first mounting portion) is configured to be detachably and reattachably mounted to the base member 16 by the fastener 14. The battery receiving part 152 is configured and dimensioned to receive the battery 48. The arm part 154 is configured to connect the mounting part 150 and the battery receiving part 152. The arm part 154 of the battery bracket 122 is configured to maintain a relative position of the battery receiving part 152 to the mounting part 150. The battery receiving part 152 and the arm part 154 (i.e., the second mounting portion) are configured to support the battery 48 at a position with the battery 48 being disposed primarily rearward of the base member 16 while the base member 16 is mounted to the bicycle frame 1. Also the battery receiving part 152 and the arm part 154 (i.e., the second mounting portion) is further configured to support the battery 48 at a position disposed primarily below the base member 116 while the electric bicycle rear derailleur 112 is mounted to the bicycle frame 1.

Figure 8:
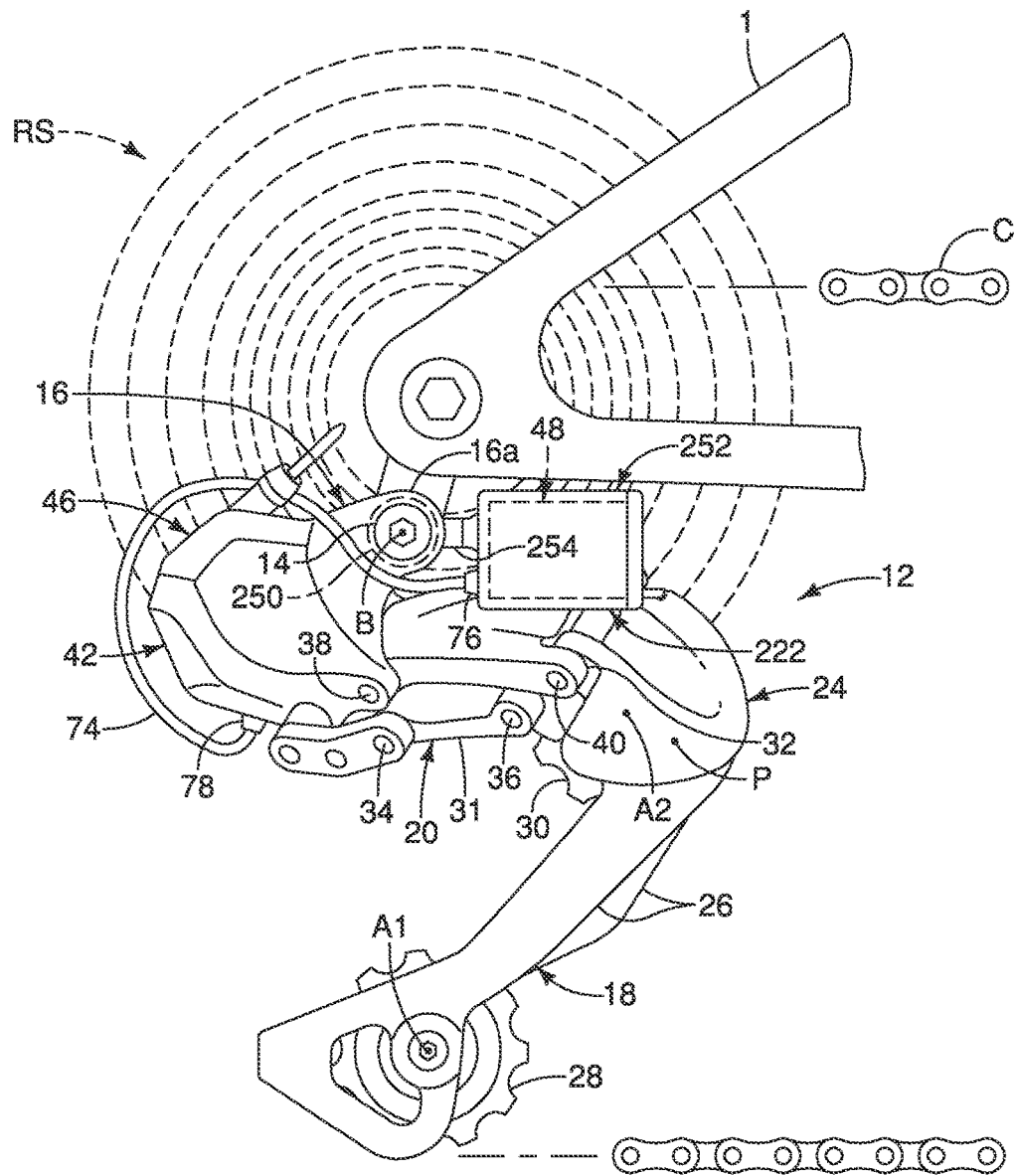
FIG. 8 is an outside elevational view of the portion of the bicycle frame and the rear derailleur illustrated in FIG. 1, but with a second alternative battery bracket supporting the battery in a location that is primarily forward and primarily above the base member of the rear derailleur while the rear derailleur is mounted to the bicycle frame.
Figure 9:
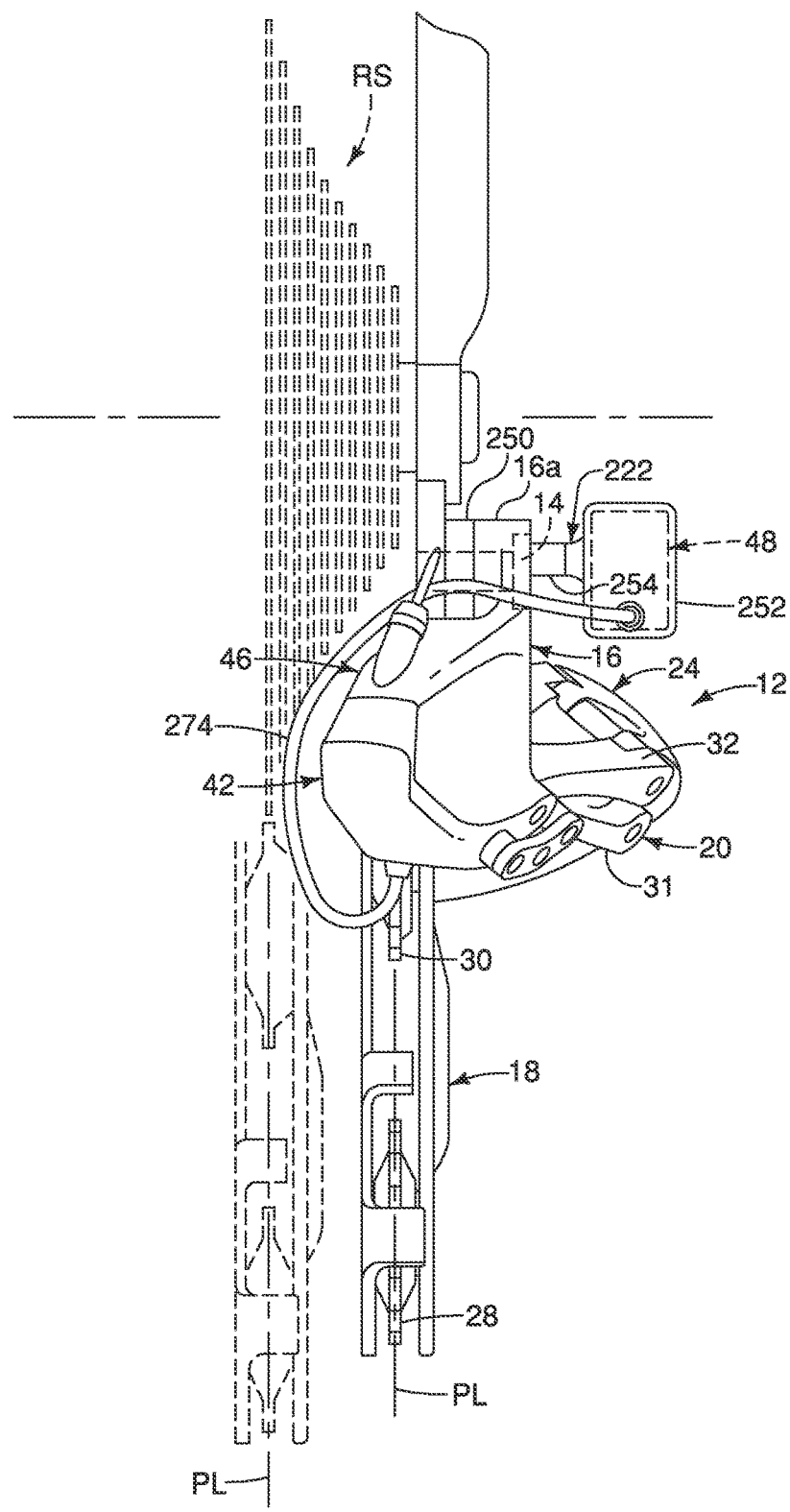
FIG. 9 is a rear elevational view of the portion of the bicycle frame and the rear derailleur illustrated in FIG. 8, with the second alternative battery bracket supporting the battery in a location that is primarily forward and primarily above the base member of the rear derailleur while the rear derailleur is mounted to the bicycle frame.

Turning now to FIGS. 8 and 9, a second alternative battery bracket 222 will now be discussed that is used with the electric bicycle rear derailleur 12. The battery bracket 222 includes a mounting part 250, a battery receiving part 252 and an arm part 254. The battery receiving part 252 is configured and dimensioned to support the battery 48 therein.

The mounting part 250 (i.e., the first mounting portion) is configured to be detachably and reattachably mounted to the base member 16 by the fastener 14. The battery bracket 222 extends from a frame facing side of the base member 16. In other words, the mounting part 250 is located on a non-frame facing side of the mounting portion 116a of the base member 16 while the base member 16 is mounted to the bicycle frame 1 by the fastener 14.

The battery receiving part 252 is configured and dimensioned to receive the battery 48. The arm part 254 is configured to connect the mounting part 250 and the battery receiving part 252. The arm part 254 of the battery bracket 222 is configured to maintain a relative position of the battery receiving part 252 to the mounting part 250. The battery receiving part 252 and the arm part 254 (i.e., the second mounting portion) are configured to support the battery 48 at a position with the battery 48 being disposed primarily forward of the base member 16 while the base member 16 is mounted to the bicycle frame 1. Also the battery receiving part 252 and the arm part 254 (i.e., the second mounting portion) is further configured to support the battery 48 at a position disposed primarily above the base member 16 while the electric bicycle rear derailleur 12 is mounted to the bicycle frame 1.

Figure 10:
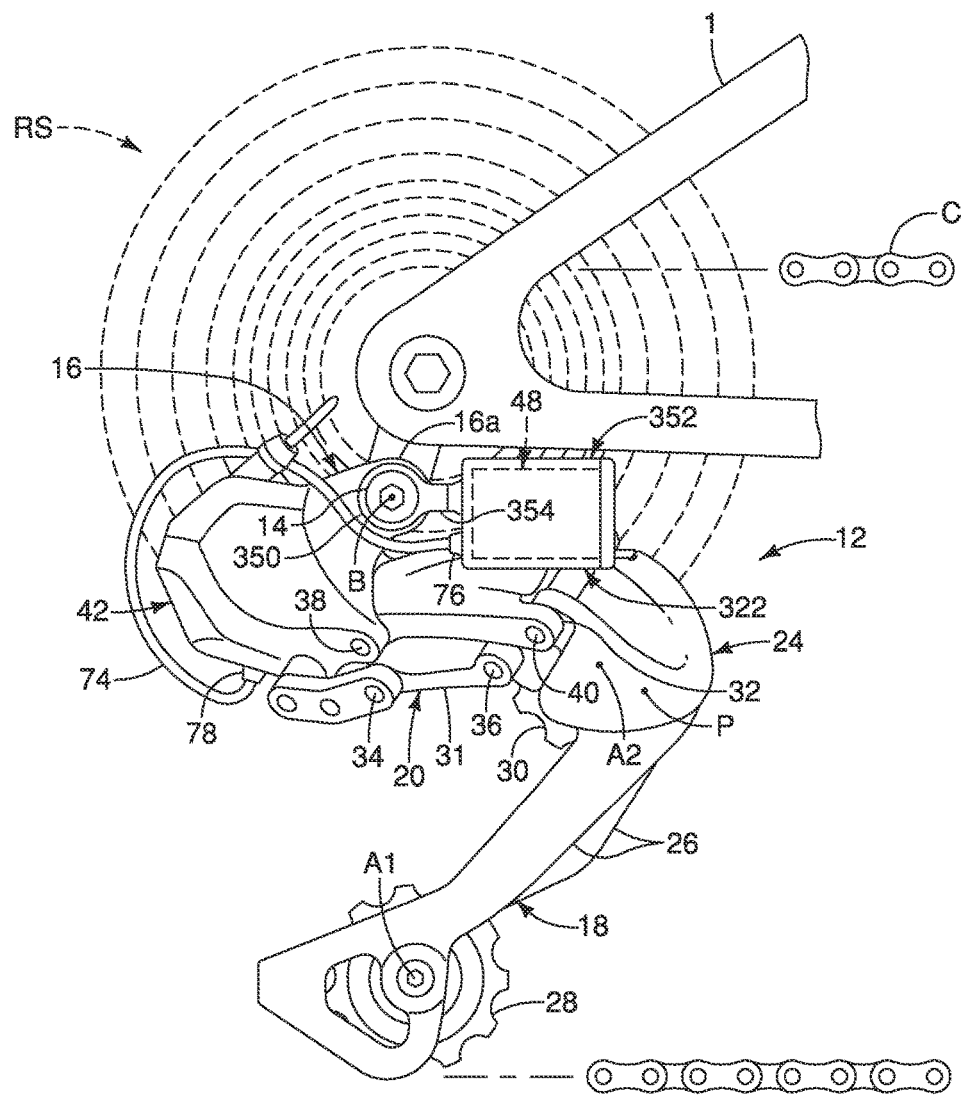
FIG. 10 is an outside elevational view of the portion of the bicycle frame and the rear derailleur illustrated in FIG. 1, but with a third alternative battery bracket supporting the battery in a location that is primarily forward and primarily above the base member of the rear derailleur while the rear derailleur is mounted to the bicycle frame.
Figure 11:
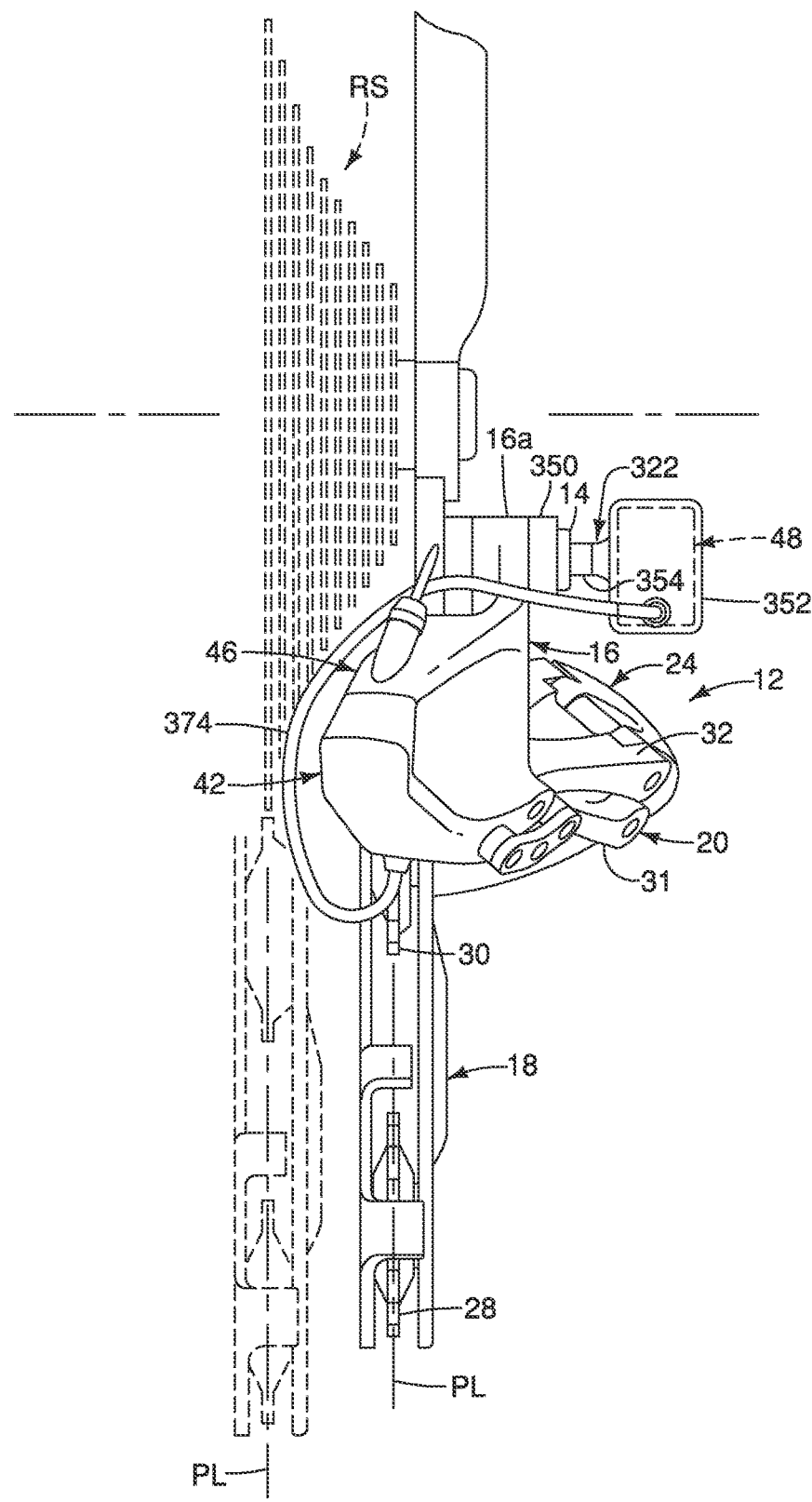
FIG. 11 is a rear elevational view of the portion of the bicycle frame and the rear derailleur illustrated in FIG. 10, with the third alternative battery bracket supporting the battery in a location that is primarily forward and primarily above the base member of the rear derailleur while the rear derailleur is mounted to the bicycle frame.
Figure 12:
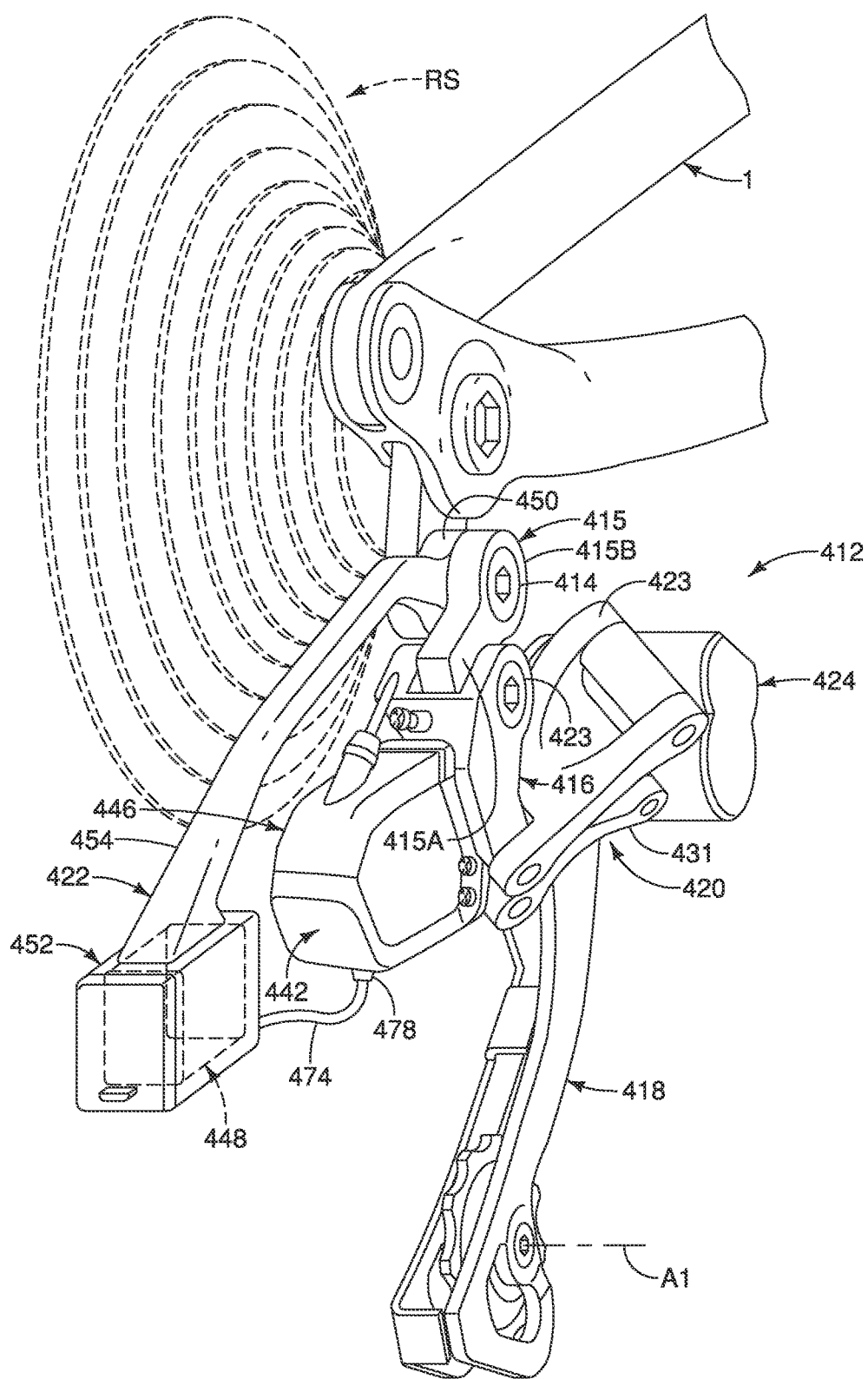
FIG. 12 is a rear perspective of a portion of a bicycle frame that is equipped with an electric bicycle rear derailleur in accordance with a second illustrated embodiment in which the rear derailleur has a battery mounted to the rear derailleur via a fourth alternative battery bracket that supports the battery in a location that is primarily rearward and primarily below a base member of the rear derailleur while the rear derailleur is mounted to the bicycle frame.
Figure 13:
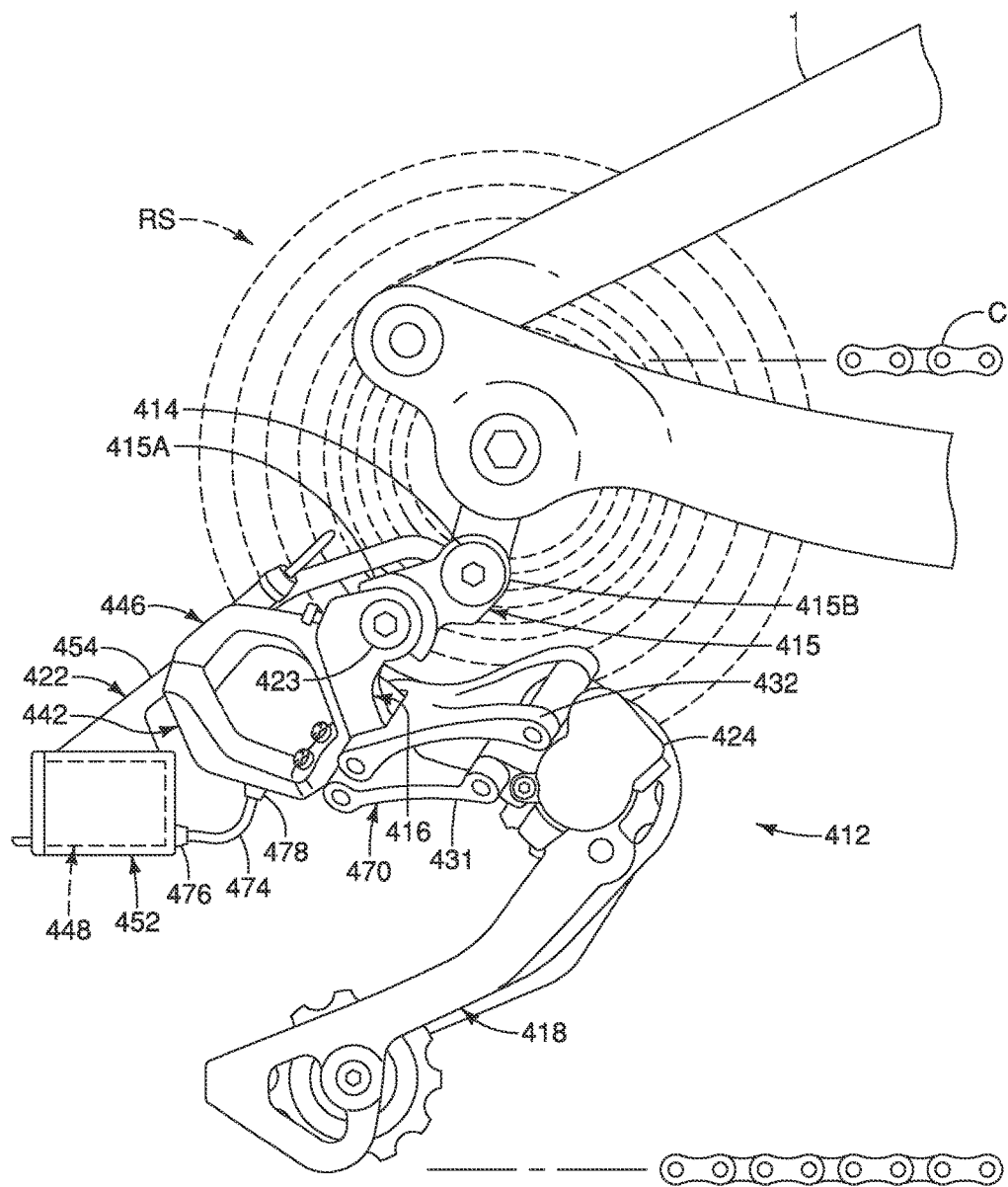
FIG. 13 is an outside elevational view of the portion of the bicycle frame the rear derailleur illustrated in FIG. 12 with the fourth alternative battery bracket supporting the battery in a location that is primarily rearward and primarily below the base member of the rear derailleur while the rear derailleur is mounted to the bicycle frame.
Figure 14:
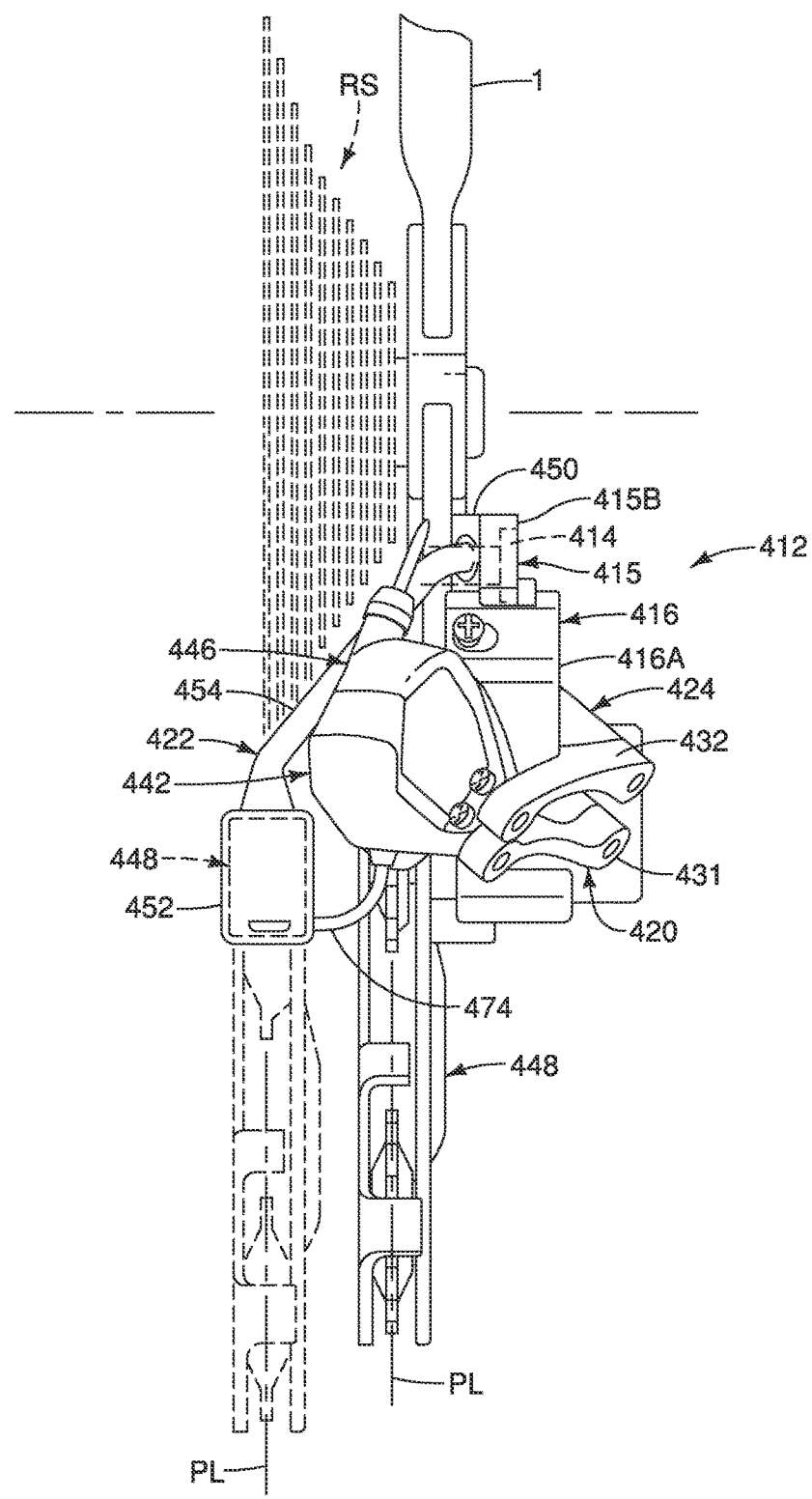
FIG. 14 is a rear elevational view of the portion of the bicycle frame the rear derailleur illustrated in FIGS. 12 and 13, with the fourth alternative battery bracket supporting the battery in a location that is primarily rearward and primarily below the base member of the rear derailleur while the rear derailleur is mounted to the bicycle frame.

Turning now to FIGS. 10 and 11, a third alternative battery bracket 322 will now be discussed that is used with the electric bicycle rear derailleur 12. The battery bracket 322 includes a mounting part 350, a battery receiving part 352 and an arm part 354. The battery receiving part 352 is configured and dimensioned to support the battery 48 therein. Here, the battery bracket 322 is identical to the battery bracket 222, except that the configuration of the arm part 354 has been modified so that the mounting part 350 is mounted on a non-frame facing side of the mounting portion 16a of the base member 16 while the base member 16 is mounted to the bicycle frame 1 by the fastener 14.

The mounting part 350 (i.e., the first mounting portion) is configured to be detachably and reattachably mounted to the base member 116 by the fastener 14. The battery bracket 322 extends from a side opposite to a frame facing side of the base member 16. In other words, the mounting part 350 is located on a non-frame facing side of the mounting portion 16a of the base member 16 while the base member 16 is mounted to the bicycle frame 1 by the fastener 14.

The battery receiving part 352 is configured and dimensioned to receive the battery 48. The arm part 354 is configured to connect the mounting part 350 and the battery receiving part 352. The arm part 354 of the battery bracket 322 is configured to maintain a relative position of the battery receiving part 352 to the mounting part 350. The battery receiving part 352 and the arm part 354 (i.e., the second mounting portion) are configured to support the battery 48 at a position with the battery 48 being disposed primarily forward of the base member 16 while the base member 16 is mounted to the bicycle frame 1. Also the battery receiving part 352 and the arm part 354 (i.e., the second mounting portion) is further configured to support the battery 48 at a position disposed primarily above the base member 16 while the electric bicycle rear derailleur 12 is mounted to the bicycle frame 1.

Turning now to FIGS. 12 to 16, an electric bicycle rear derailleur 412 will now be discussed in accordance with a second embodiment. In view of the similarities between the electric bicycle rear derailleurs 12 and 412, the electric bicycle rear derailleur 12 will not be discussed in as much detail.

In the second embodiment, the electric bicycle rear derailleur 412 is mounted to the bicycle frame 1 via a fastener 414 (e.g., a fixing bolt). In particular, the electric bicycle rear derailleur 412 comprises a derailleur bracket 415 that is mounted to the bicycle frame 1 using the fastener 414. The electric bicycle rear derailleur 412 basically comprises a base member 416, a chain guide 418, a linkage assembly 420 and a fourth alternative battery bracket 422, Here, the derailleur bracket 415 including a first attachment portion 415A that is mounted to the base member 416, and a second attachment portion 415B that is configured to be mounted to a bicycle frame 1.

The base member 416 includes a mounting portion 416a that rotatably retains a fastener 423 (e.g., a fixing bolt) in a conventional manner. Thus, the base member 416 includes a frame mounting structure (i.e., the fixing bolt 423 rotatably retained on the mounting portion 416a) that is configured to be attached to the bicycle frame 1 and attaches the battery bracket 422 to the base member 416. In other words, the battery bracket 422 is supported as a separate part on the base member 416 so as to be removable and reinstalled without damaging the electric bicycle rear derailleur 412 and/or the battery bracket 422.

The chain guide 418 is coupled to the linkage assembly 420 by a movable member 424. The linkage assembly 420 operatively couples the chain guide 418 to the base member 416. Similar to the first embodiment, the linkage assembly 420 includes a first or inner link 431 and a second or outer link 432.

Similar to the first embodiment, the electric bicycle rear derailleur 412 further comprises an electric motor unit 442 that is disposed on the base member 416 and a wireless communications unit 446. The electric motor unit 442 and the wireless communications unit 446 are basically the same as the electric motor unit 42 and the wireless communications unit 46 as discussed above. Thus, the electric motor unit 442 and the wireless communications unit 446 will not be further discussed herein.

Figure 15:
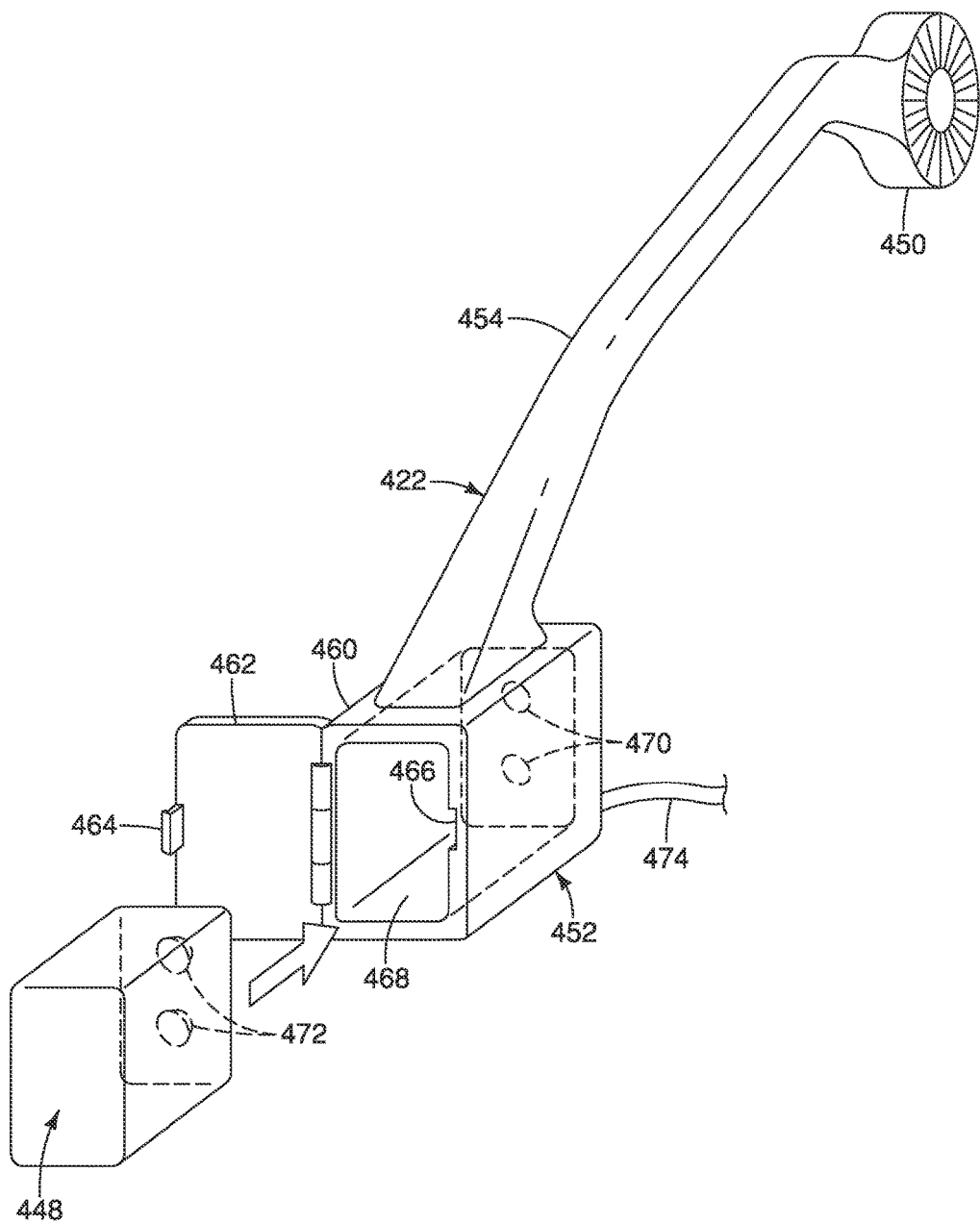
FIG. 15 is an enlarged, rear perspective view of the fourth alternative battery bracket illustrated in FIGS. 12 to 14, with the battery exploded out therefrom.
Figure 16:
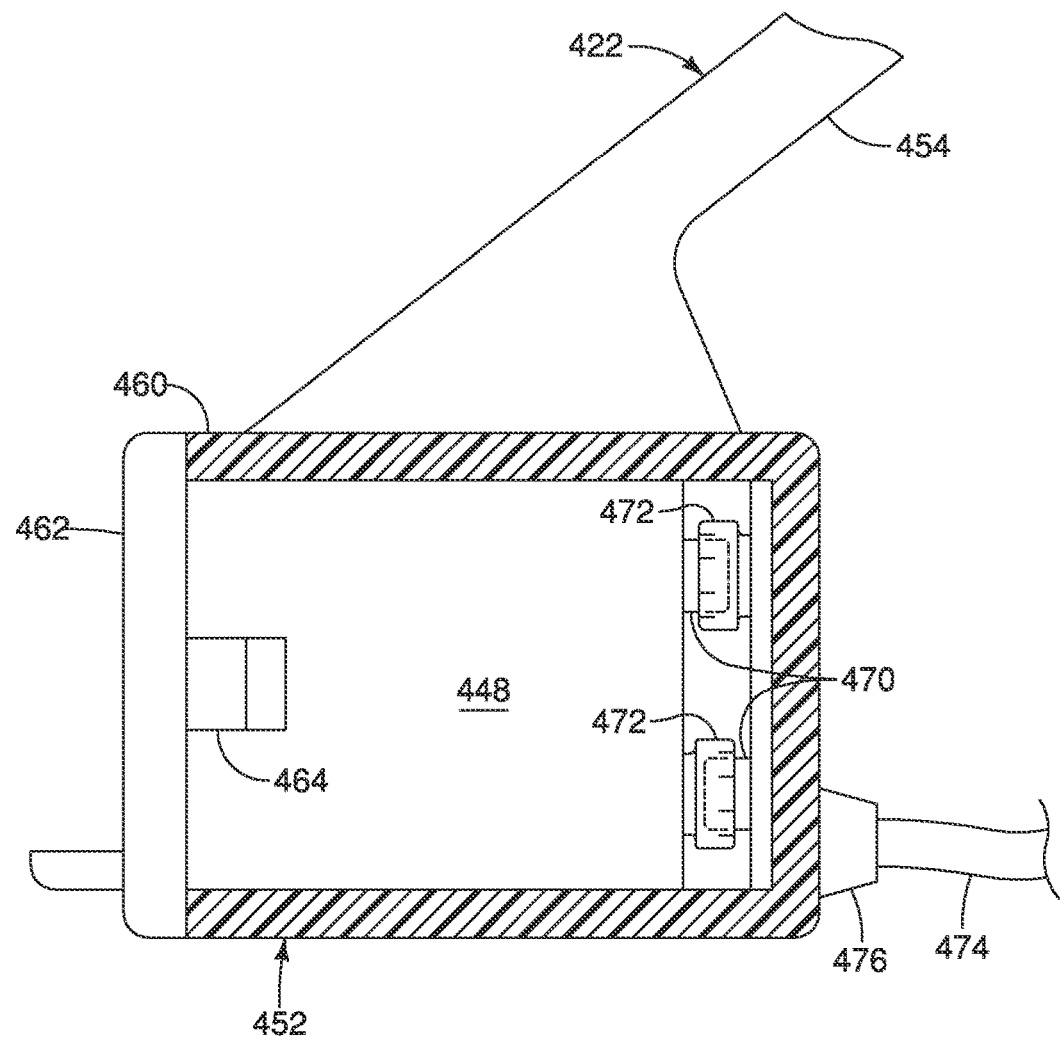
FIG. 16 is an enlarged, partial elevational view of the battery bracket illustrated in FIGS. 12 to 14, with a portion of the fourth alternative battery bracket broken away to show the battery therein.

Referring to FIGS. 15 and 16, the battery bracket 422 will now be discussed in more detail. The battery bracket 422 includes a mounting part 450, a battery receiving part 452 and an arm part 454. The battery receiving part 452 of the battery bracket 422 configured to receive a battery 448.

Preferably, the battery 448 is removable from the battery bracket 422 so that the battery 448 can be recharged or replaced. Thus, the battery 448 is mounted on the battery bracket 422. The battery 448 can be any suitable electrical power source such as a rechargeable electrical battery, a disposable electrical battery, a fuel cell battery, etc. Here, the battery 448 is identical to the battery 48 discussed above.

Similar to the first embodiment, the mounting part 450, the battery receiving part 452 and the arm part 454 are preferably constructed of suitable rigid materials such as an aluminum alloy or a fiber reinforced plastic. The mounting part 450 of the battery bracket 422 constitutes a first mounting portion, while the battery receiving part 452 and the arm part 454 constitutes a second mounting portion. Thus, the battery bracket 422 comprises a first mounting portion and a second mounting portion.

In this second embodiment, the mounting part 450 (i.e., the first mounting portion) is configured to be attached to the base member 416 via the fixing bolt 414 and the derailleur bracket 415. The battery bracket 422 is disposed on the second attachment portion 415B of the derailleur bracket 415. The mounting part 450 is located on the frame facing side of the derailleur bracket 415. The arm part 454 is configured to connect the mounting part 450 and the battery receiving part 452. The arm part 454 of the battery bracket 422 is configured to maintain a relative position of the battery receiving part 452 to the mounting part 450.

Referring back to FIGS. 12 to 14, the arm part 454 of the battery bracket 422 extends from a frame facing side of the base member 416, In particular, the arm part 454 of the battery bracket 422 is mounted on a frame facing side of the derailleur bracket 415. The battery receiving part 452 and the arm part 454 (i.e., the second mounting portion) are configured to support the battery 448 at a position with the battery 448 being disposed primarily rearward of the base member 416 while the base member 416 is mounted to the bicycle frame 1. Also the battery receiving part 452 and the arm part 454 (i.e., the second mounting portion) is further configured to support the battery 448 at a position disposed primarily below the base member 416 while the electric bicycle rear derailleur 412 is mounted to the bicycle frame 1.

The battery receiving part 452 includes a housing 460 and a cover 462. The cover 462 is hinged to the housing 460. The cover 62 includes a latch 64 that engages a notch 466 of the housing 460, The housing 460 has a cavity 468 that is dimension for receiving the battery 448. Here, the electrical wire 474 includes a pair of wire terminals 470 that is mounted on the battery bracket 422. The battery 448 includes a pair of plug-in terminals 472 mates with the wire terminals 470. Thus, the wire terminals 470 form a first electrical interface, while the plug-in terminals 472 form a second electrical interface. However, the first and second electrical interfaces can be any suitable electrical interfaces that electrically transmit electrical power therebetween. For example, the first and second interfaces can be contactless electrical connectors in which the metal electrical contacts of the mating electrical connectors do not create physically electrical connection for contactless power (contactless connectivity).

The battery 448 is electrically connected to the electric motor unit 442 by an electrical wire 474. The electrical wire extends directly between the electric motor unit 442 and the battery bracket 422. In particular, the electrical wire 744 has a first electrical connector 476 that plugs into an electrical port of the housing 460 and a second connector 478 that plugs into the electric motor unit 442. The electrical contacts 470 of the housing 460 are thus electrically connected to electrical conductors of the electrical wire 474. Alternatively, the electrical wire 474 can be electrically connected in a non-releasable manner to both the electrical contacts 470 of the housing 460 and the electrical contacts 470 of the electric motor unit 442.

Figure 17:
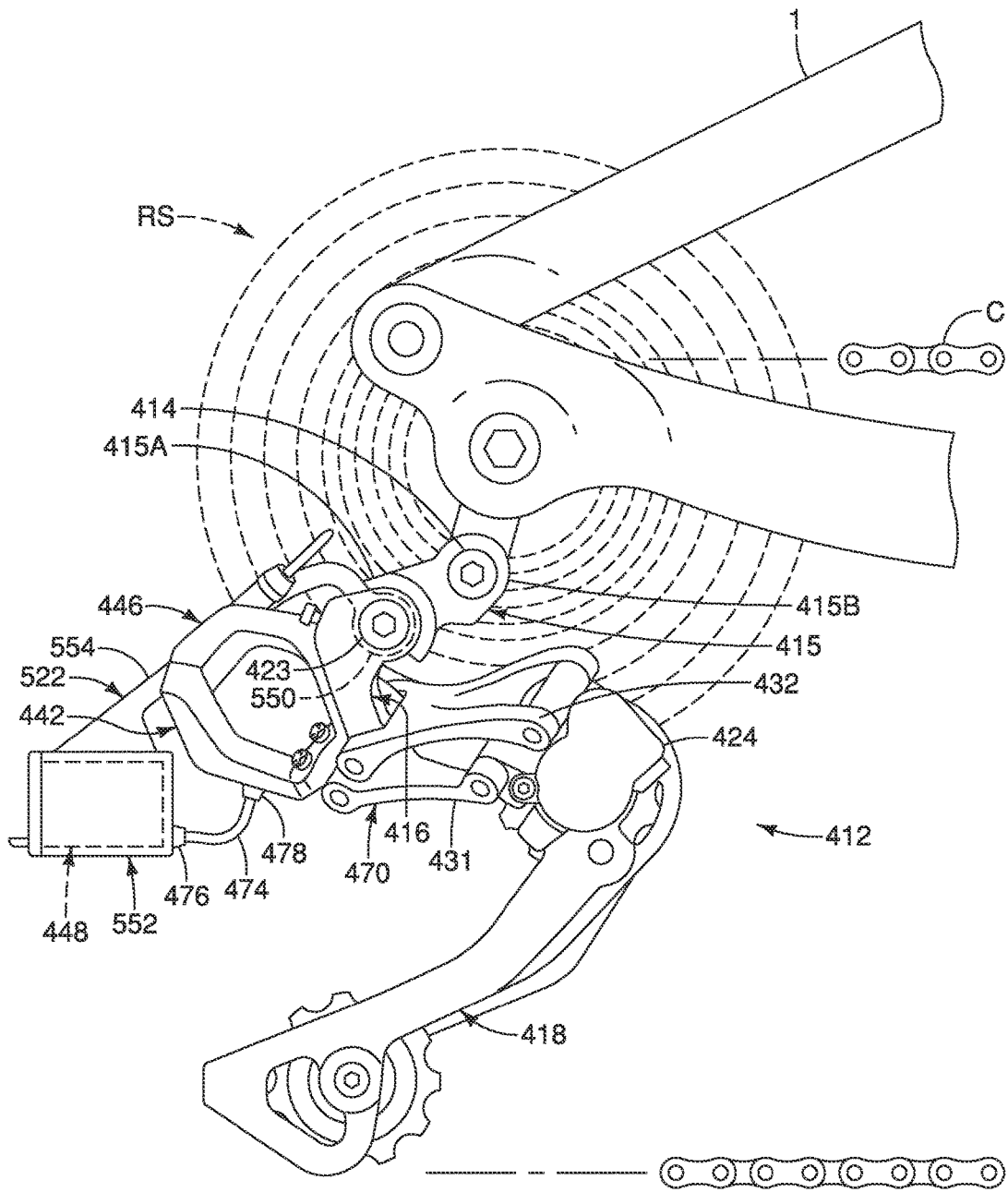
FIG. 17 is an outside elevational view of the portion of the bicycle frame and the rear derailleur illustrated in FIG. 12, but with a fifth alternative battery bracket supporting the battery in a location that is primarily rearward and primarily below the base member of the rear derailleur while the rear derailleur is mounted to the bicycle frame.
Figure 18:
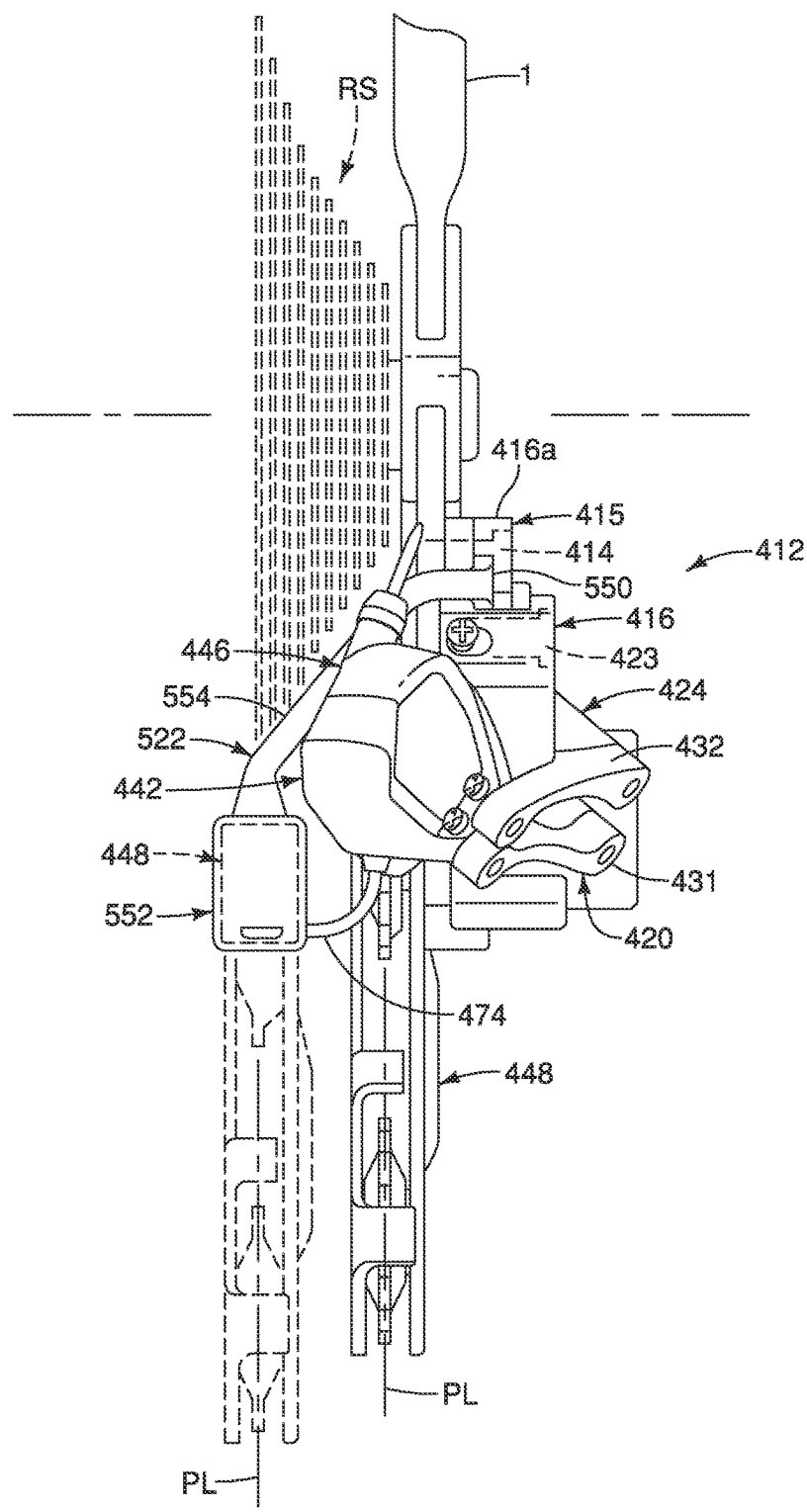
FIG. 18 is a rear elevational view of the portion of the bicycle frame and the rear derailleur illustrated in FIG. 17, with the fifth alternative battery bracket supporting the battery in a location that is primarily rearward and primarily below the base member of the rear derailleur while the rear derailleur is mounted to the bicycle frame.

Turning now to FIGS. 17 and 18, a fifth alternative battery bracket 522 will now be discussed that is used with the electric bicycle rear derailleur 412. The battery bracket 522 includes a mounting part 550, a battery receiving part 552 and an arm part 554. Here, the battery bracket 522 is identical to the battery bracket 422, except that the configuration of the arm part 554 has been modified so that the mounting part 550 is mounted on a frame facing side of the derailleur bracket 415 by the fastener 423 while the base member 416 is mounted to the bicycle frame 1 by the fastener 414 and the derailleur bracket 415. In particular, the battery bracket 522 is disposed on the first attachment portion 415A of the derailleur bracket 415.

The mounting part 550 (i.e., the first mounting portion) is configured to be detachably and reattachably mounted to the base member 416 by the fastener 414 via the derailleur bracket 415. The battery receiving part 552 is configured and dimensioned to receive the battery 448. The arm part 554 is configured to connect the mounting part 550 and the battery receiving part 552. The arm part 554 of the battery bracket 522 is configured to maintain a relative position of the battery receiving part 552 to the mounting part 550. The battery receiving part 552 and the arm part 554 (i.e., the second mounting portion) are configured to support the battery 448 at a position with the battery 448 being disposed primarily rearward of the base member 416 while the base member 416 is mounted to the bicycle frame 1.

Figure 19:
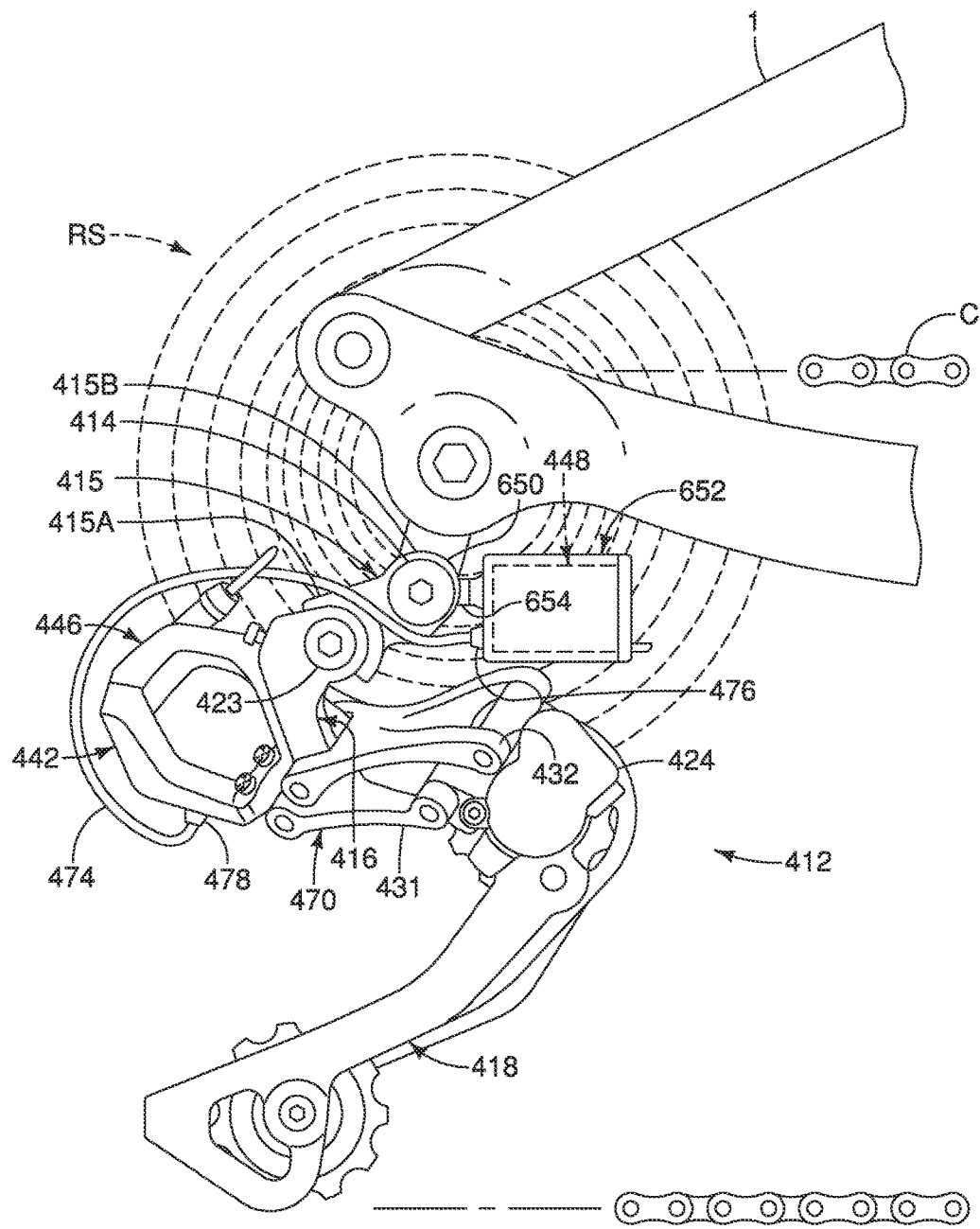
FIG. 19 is an outside elevational view of the portion of the bicycle frame and the rear derailleur illustrated in FIG. 12, but with a sixth alternative battery bracket supporting the battery in a location that is primarily forward and primarily above the base member of the rear derailleur while the rear derailleur is mounted to the bicycle frame.
Figure 20:
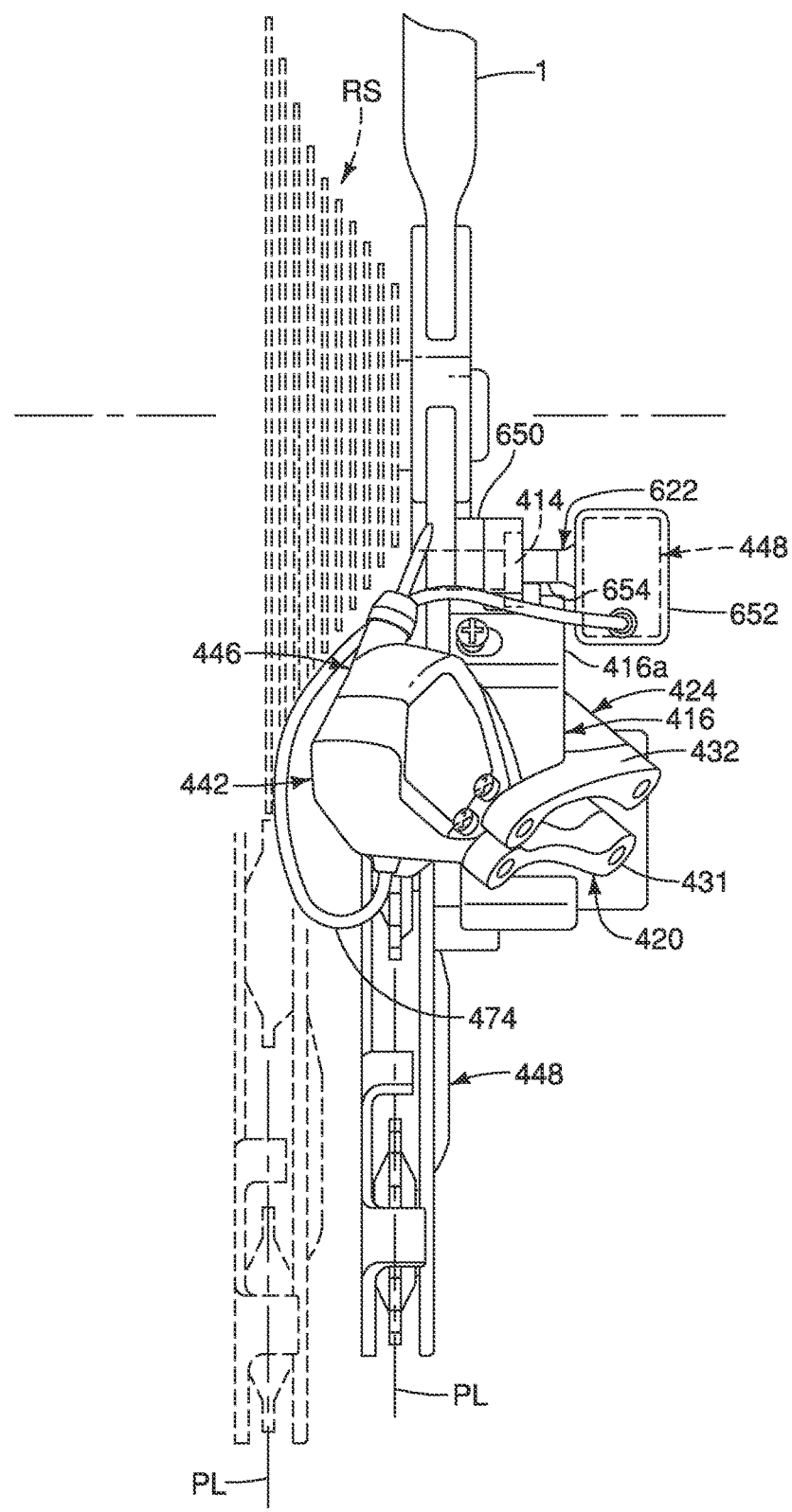
FIG. 20 is a rear elevational view of the portion of the bicycle frame and the rear derailleur illustrated in FIG. 19, with the sixth alternative battery bracket supporting the battery in a location that is primarily forward and primarily above the base member of the rear derailleur while the rear derailleur is mounted to the bicycle frame.

Turning now to FIGS. 19 and 20, a sixth alternative battery bracket 622 will now be discussed that is used with the electric bicycle rear derailleur 412. The battery bracket 622 includes a mounting part 650, a battery receiving part 652 and an arm part 654. The battery receiving part 652 is configured and dimensioned to support the battery 448 therein. Here, the arm part 654 has been modified on that the mounting part 650 is mounted on a non-frame facing side of the derailleur bracket 415 by the fastener 414 while the base member 416 is mounted to the bicycle frame 1 by the fastener 414 and the derailleur bracket 415. In particular, the battery bracket 622 is disposed on the second attachment portion 415B of the derailleur bracket 415.

The mounting part 650 (i.e., the first mounting portion) is configured to be detachably and reattachably mounted to the base member 416 by the fastener 414 via the derailleur bracket 415. The battery bracket 622 extends from a frame facing side of the base member 416. In other words, the mounting part 660 is located on a non-frame facing side of the derailleur bracket 415 white the base member 416 is mounted to the bicycle frame 1 by the fastener 414.

The battery receiving part 652 is configured and dimensioned to receive the battery 448. The arm part 654 is configured to connect the mounting part 650 and the battery receiving part 652. The arm part 654 of the battery bracket 622 is configured to maintain a relative position of the battery receiving part 652 to the mounting part 650. The battery receiving part 652 and the arm part 654 (i.e., second mounting portion) are configured to support the battery 448 at a position with the battery 448 being disposed primarily forward of the base member 416 while the base member 416 is mounted to the bicycle frame 1. Also the battery receiving part 652 and the arm part 654 (i.e., the second mounting portion) is further configured to support the battery 448 at a position disposed primarily above the base member 416 while the electric bicycle rear derailleur 412 is mounted to the bicycle frame 1.

Figure 21:
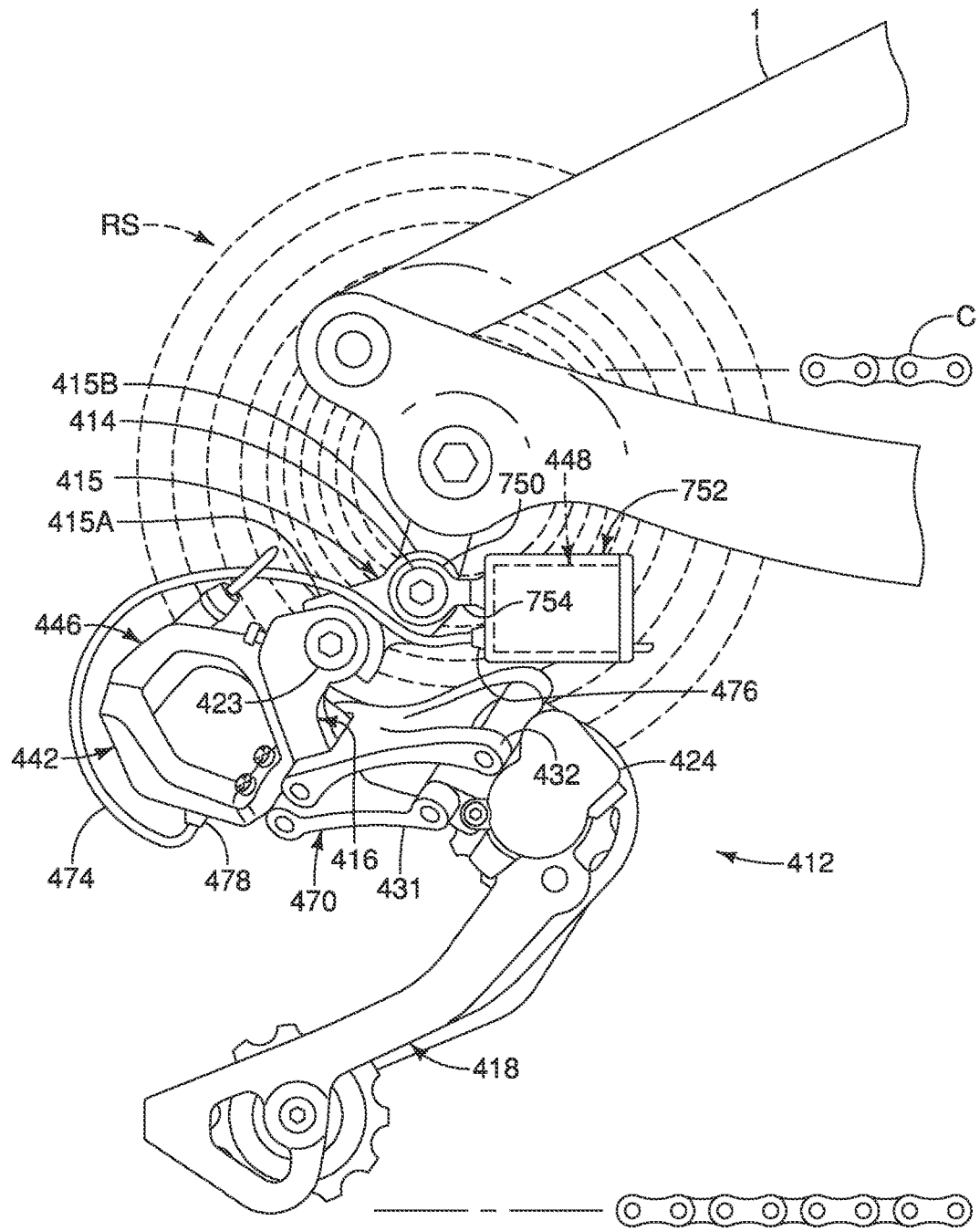
FIG. 21 is an outside elevational view of the portion of the bicycle frame and the rear derailleur illustrated in FIG. 12, but with a seventh alternative battery bracket supporting the battery in a location that is primarily forward and primarily above the base member of the rear derailleur while the rear derailleur is mounted to the bicycle frame.
Figure 22:
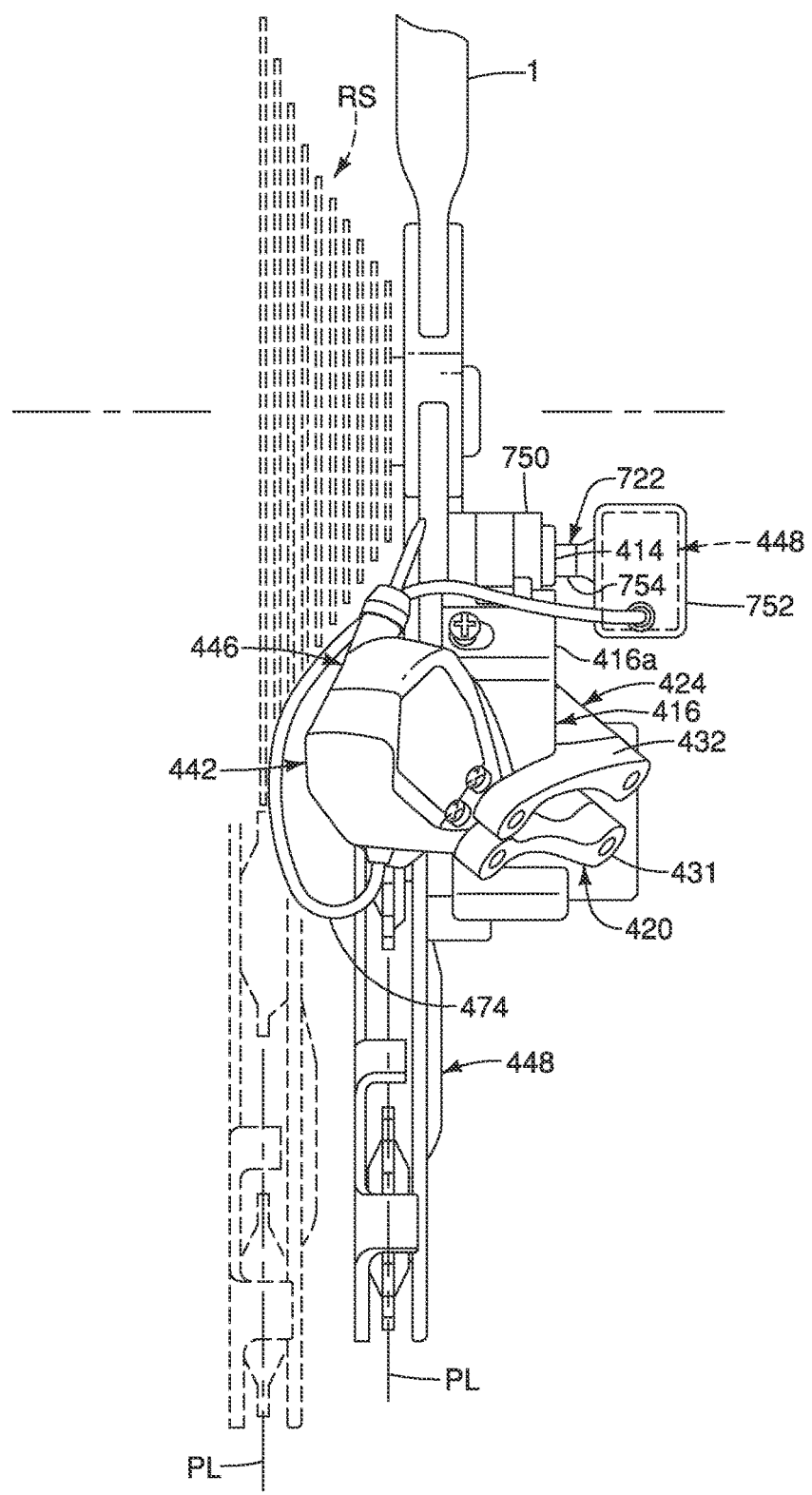
FIG. 22 is a rear elevational view of the portion of the bicycle frame and the rear derailleur illustrated in FIG. 21, with the seventh alternative battery bracket supporting the battery in a location that is primarily forward and primarily above the base member of the rear derailleur while the rear derailleur is mounted to the bicycle frame.

Turning now to FIGS. 21 and 22, a seventh alternative battery bracket 722 will now be discussed that is used with the electric bicycle rear derailleur 412. The battery bracket 722 includes a mounting part 750, a battery receiving part 752 and an arm part 754. The battery receiving part 752 is configured and dimensioned to support the battery 48 therein. Here, the battery bracket 722 is identical to the battery bracket 622, except that the configuration of the arm part 754 has been modified so that the mounting part 750 is mounted on a non-frame facing side of the derailleur bracket 415 while the base member 16 is mounted to the bicycle frame 1 by the fastener 414 and the derailleur bracket 415.

The mounting part 750 (i.e., the first mounting portion) is configured to be detachably and reattachably mounted to the base member 416 by the fastener 414 via the derailleur bracket 415. The battery bracket 722 extends from a side opposite to a frame facing side of the base member 416, In other words, the mounting part 750 is located on a non-frame facing side of the derailleur bracket 415 while the base member 416 is mounted to the bicycle frame 1 by the fastener 414.

The battery receiving part 752 is configured and dimensioned to receive the battery 448. The arm part 754 is configured to connect the mounting part 750 and the battery receiving part 752. The arm part 754 of the battery bracket 722 is configured to maintain a relative position of the battery receiving part 752 to the mounting part 750. The battery receiving part 752 and the arm part 754 (i.e., the second mounting portion) are configured to support the battery 448 at a position with the battery 448 being disposed primarily forward of the base member 416 while the base member 416 is mounted to the bicycle frame 1. Also the battery receiving part 752 and the arm part 754 (i.e., the second mounting portion) is further configured to support the battery 448 at a position disposed primarily above the base member 416 while the electric bicycle rear derailleur 412 is mounted to the bicycle frame 1.

Figure 23:
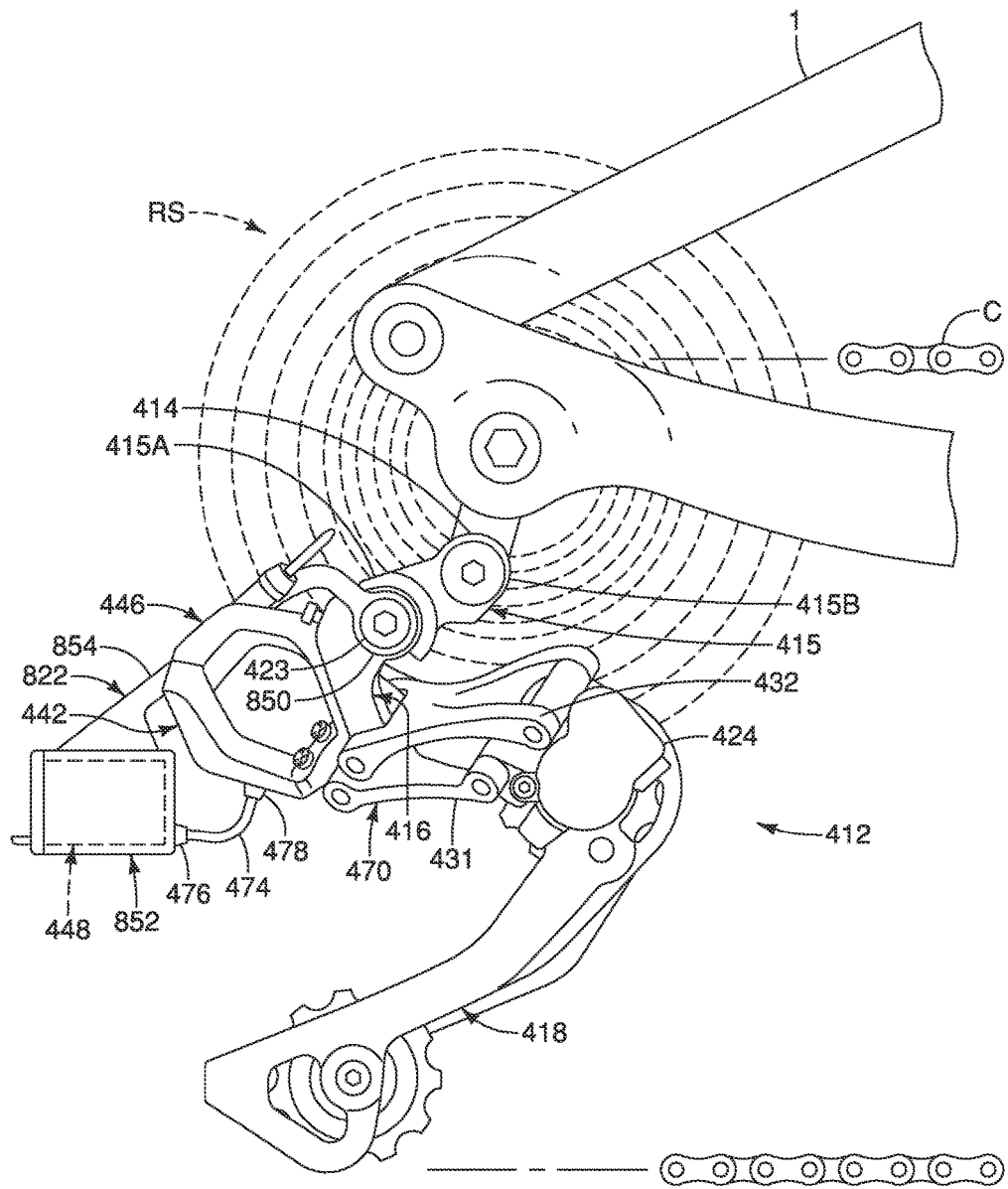
FIG. 23 is an outside elevational view of the portion of the bicycle frame and the rear derailleur illustrated in FIG. 12, but with an eighth alternative battery bracket supporting the battery in a location that is primarily rearward and primarily below the base member of the rear derailleur while the rear derailleur is mounted to the bicycle frame.
Figure 24:
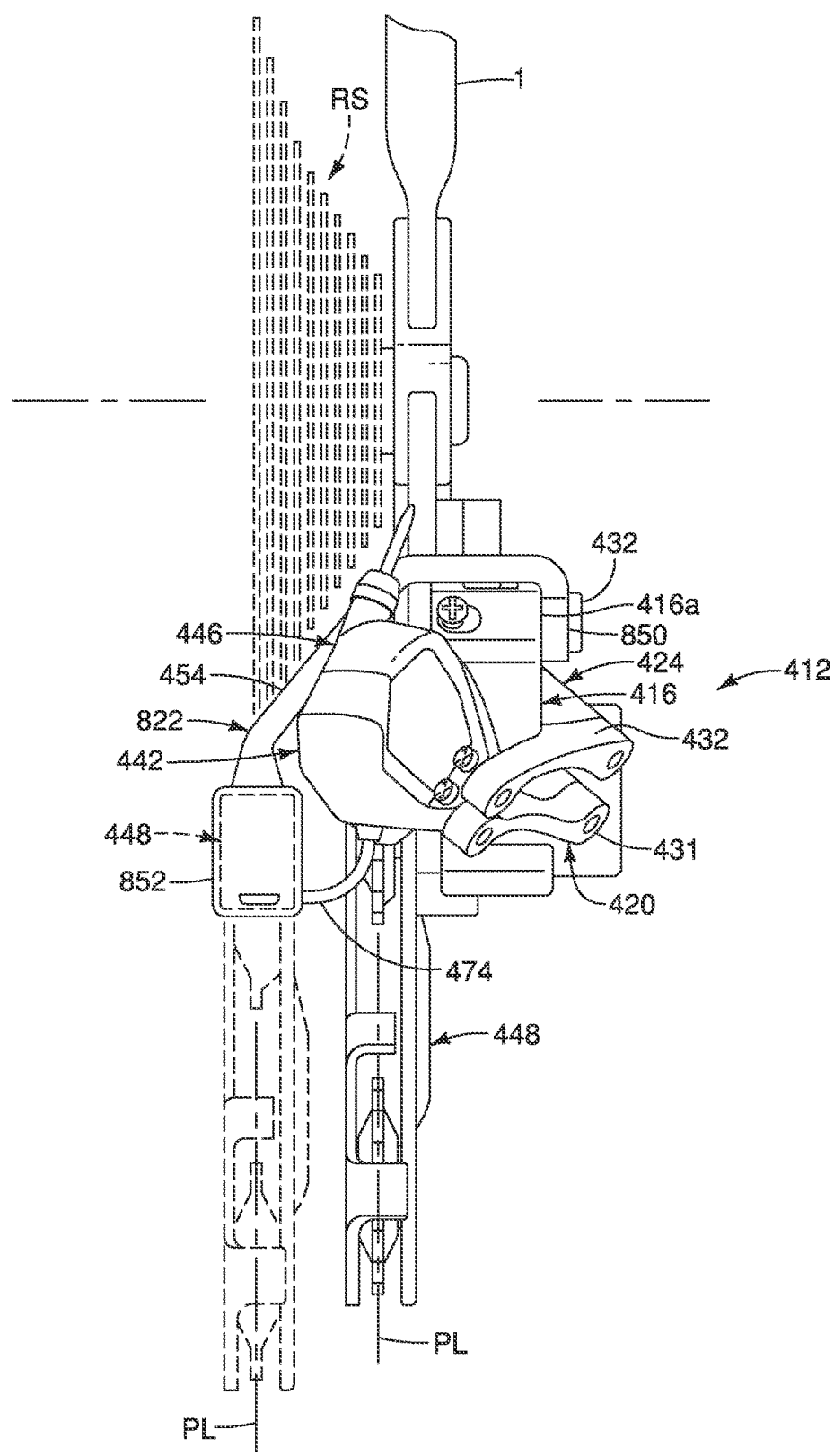
FIG. 24 is a rear elevational view of the portion of the bicycle frame and the rear derailleur illustrated in FIG. 23, with the eighth alternative battery bracket supporting the battery in a location that is primarily rearward and primarily below the base member of the rear derailleur while the rear derailleur is mounted to the bicycle frame.

Turning now to FIGS. 23 and 24, an eighth alternative battery bracket 822 will now be discussed that is used with the electric bicycle rear derailleur 412. The battery bracket 822 includes a mounting part 850, a battery receiving part 852 and an arm part 854, Here, the arm part 854 has been modified on that the mounting part 850 is mounted on a non-frame facing side of the derailleur bracket 415 by the fastener 423 while the base member 416 is mounted to the bicycle frame 1 by the fastener 4 and the derailleur bracket 415. In particular, the battery bracket 822 is disposed on the first attachment portion 415A of the derailleur bracket 415.

The mounting part 850 (i.e., the first mounting portion) is configured to be detachably and reattachably mounted to the base member 416 by the fastener 414 via the derailleur bracket 415. The battery receiving part 852 is configured and dimensioned to receive the battery 448. The arm part 854 is configured to connect the mounting part 850 and the battery receiving part 852. The arm part 854 of the battery bracket 822 is configured to maintain a relative position of the battery receiving part 852 to the mounting part 850. The battery receiving part 852 and the arm part 854 (i.e., the second mounting portion) are configured to support the battery 448 at a position with the battery 448 being disposed primarily rearward of the base member 416 while the base member 416 is mounted to the bicycle frame 1.

Figure 25:
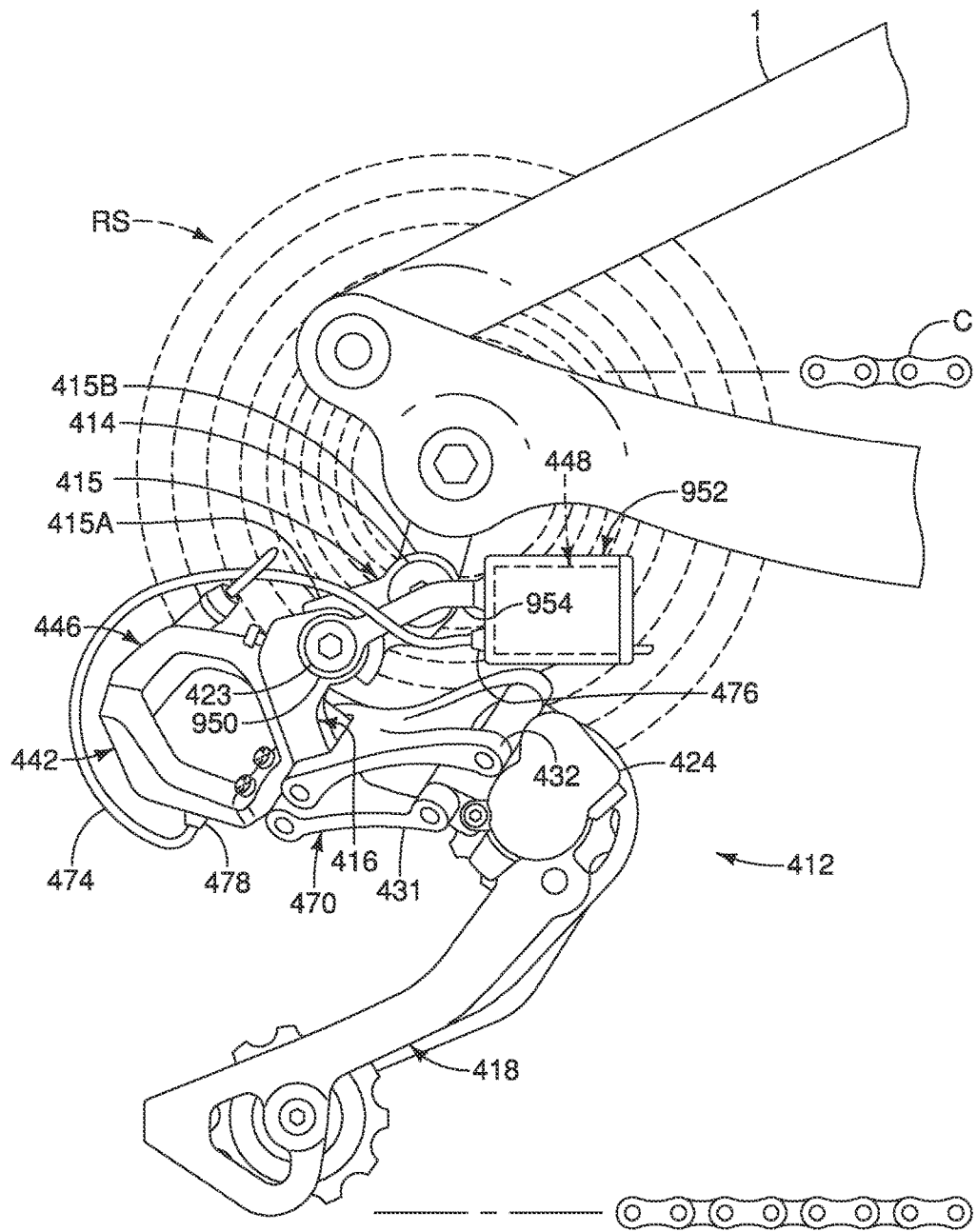
FIG. 25 is an outside elevational view of the portion of the bicycle frame and the rear derailleur illustrated in FIG. 12, but with a ninth alternative battery bracket supporting the battery in a location that is primarily forward and primarily above the base member of the rear derailleur while the rear derailleur is mounted to the bicycle frame.
Figure 26:
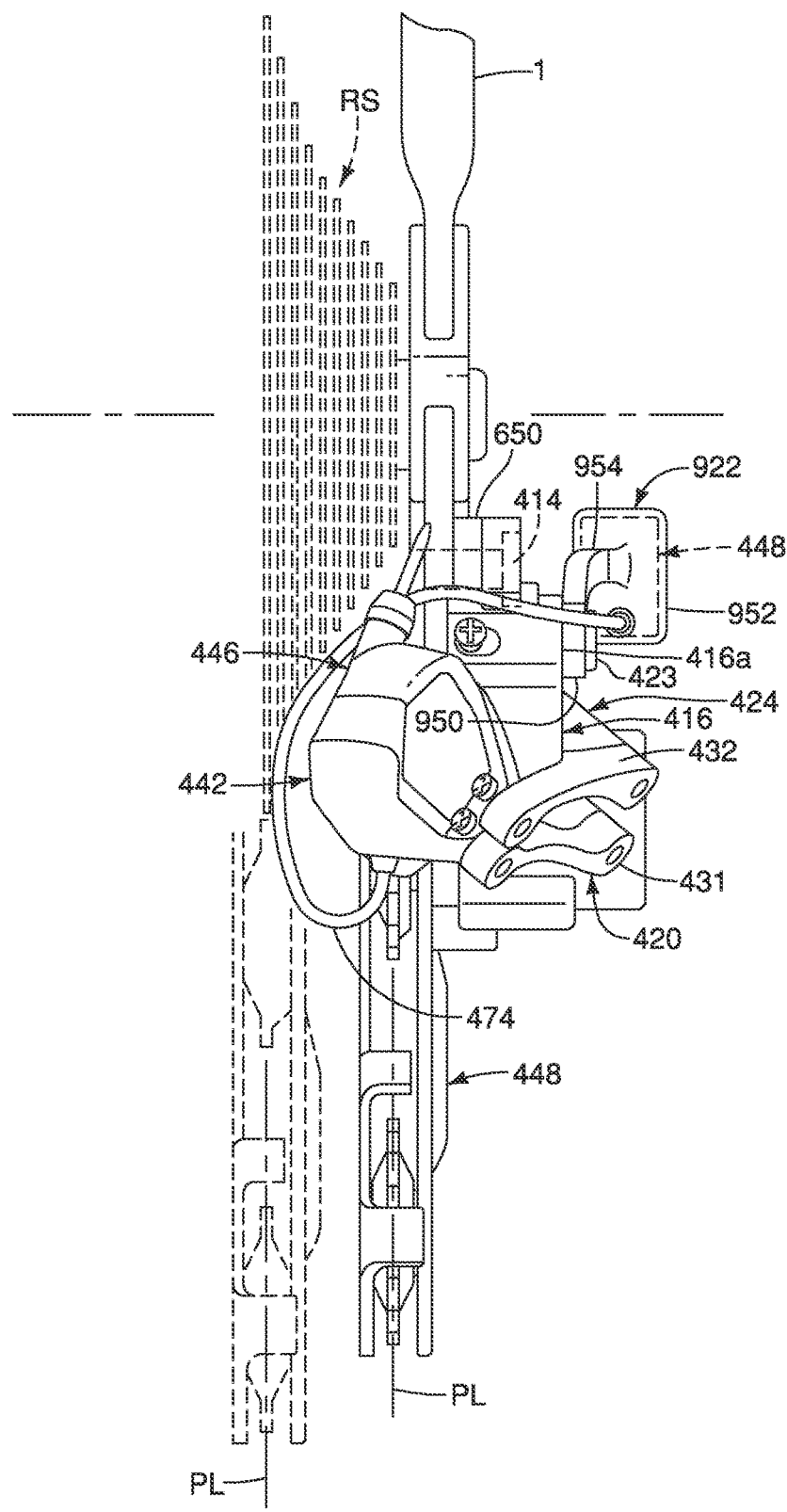
FIG. 26 is a rear elevational view of the portion of the bicycle frame and the rear derailleur illustrated in FIG. 25, with the ninth alternative battery bracket supporting the battery in a location that is primarily forward and primarily above the base member of the rear derailleur while the rear derailleur is mounted to the bicycle frame.

Turning now to FIGS. 25 and 26, a ninth alternative battery bracket 922 will now be discussed that is used with the electric bicycle rear derailleur 412. The battery bracket 922 includes a mounting part 950, a battery receiving part 952 and an arm part 954. The battery receiving part 952 is configured and dimensioned to support the battery 448 therein, Here, the arm part 954 has been modified so that the mounting part 950 is mounted on a non-frame facing side of the mounting portion 416a of the base member 416 by the fastener 423 while the base member 416 is mounted to the bicycle frame 1 by the fastener 414 and the derailleur bracket 415.

The mounting part 950 (i.e., the first mounting portion) Is configured to be detachably and reattachably mounted to the base member 416 by the fastener 414 via the derailleur bracket 415, The battery bracket 922 extends from a side opposite to a frame facing side of the base member 416. In other words, the mounting part 960 is located on a non-frame facing side of the mounting portion 416a of the base member 416 while the base member 416 is mounted to the bicycle frame 1 by the fastener 414.

The battery receiving part 952 is configured and dimensioned to receive the battery 448. The arm part 954 is configured to connect the mounting part 650 and the battery receiving part 952. The arm part 954 of the battery bracket 922 is configured to maintain a relative position of the battery receiving part 952 to the mounting part 950. The battery receiving part 952 and the arm part 954 (i.e., the second mounting portion) are configured to support the battery 448 at a position with the battery 448 being disposed primarily forward of the base member 416 while the base member 416 is mounted to the bicycle frame 1. Also the battery receiving part 952 and the arm part 954 (i.e., the second mounting portion) is further configured to support the battery 448 at a position disposed primarily above the base member 416 while the electric bicycle rear derailleur 412 is mounted to the bicycle frame 1.

Figure 27:
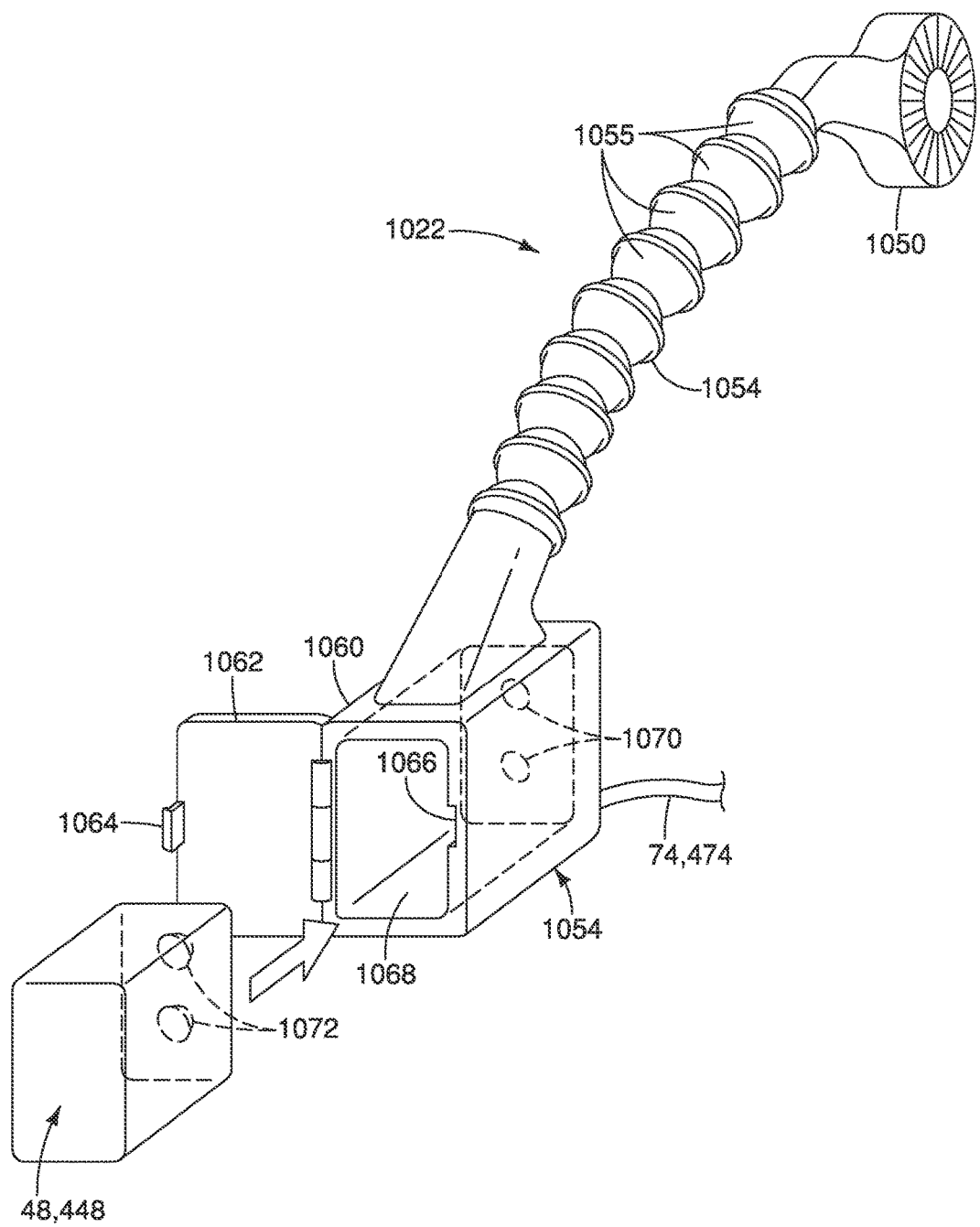
FIG. 27 is a tenth alternative battery bracket that supports a battery in a location that is primarily rearward and primarily below a base member of either the rear derailleurs of the first and second embodiments.

Turning now to FIG. 27, an eleventh alternative battery bracket 1022 will now be discussed that can be used with either the electric bicycle rear derailleur 12 of the first embodiment or the electric bicycle rear derailleur 412 of the second embodiment. The battery bracket 1022 includes a mounting part 1050, a battery receiving part 1052 and an arm part 1054. The battery receiving part 1052 is configured and dimensioned to support the battery 48 or 448 therein.

The arm part 1054 of the battery bracket 1022 includes a plurality of ball and socket joint connectors 1055. As a result, the arm part 1054 is configured to flexibly maintain a relative position of the battery receiving part 1052 to the mounting part 1050. With the ball and socket joint connectors 1055, the arm part 1054 can be bent and/or twisted on the battery receiving part 1052 can be located either primarily rearward or primarily forward of the base member (16 or 416), and either primarily below or primarily above the base member (16 or 416). A more detailed description of the ball and socket joint connectors 1055 can be found in U.S. Pat. No. 7,891,615, assigned to Joby Photo.

Figure 28:
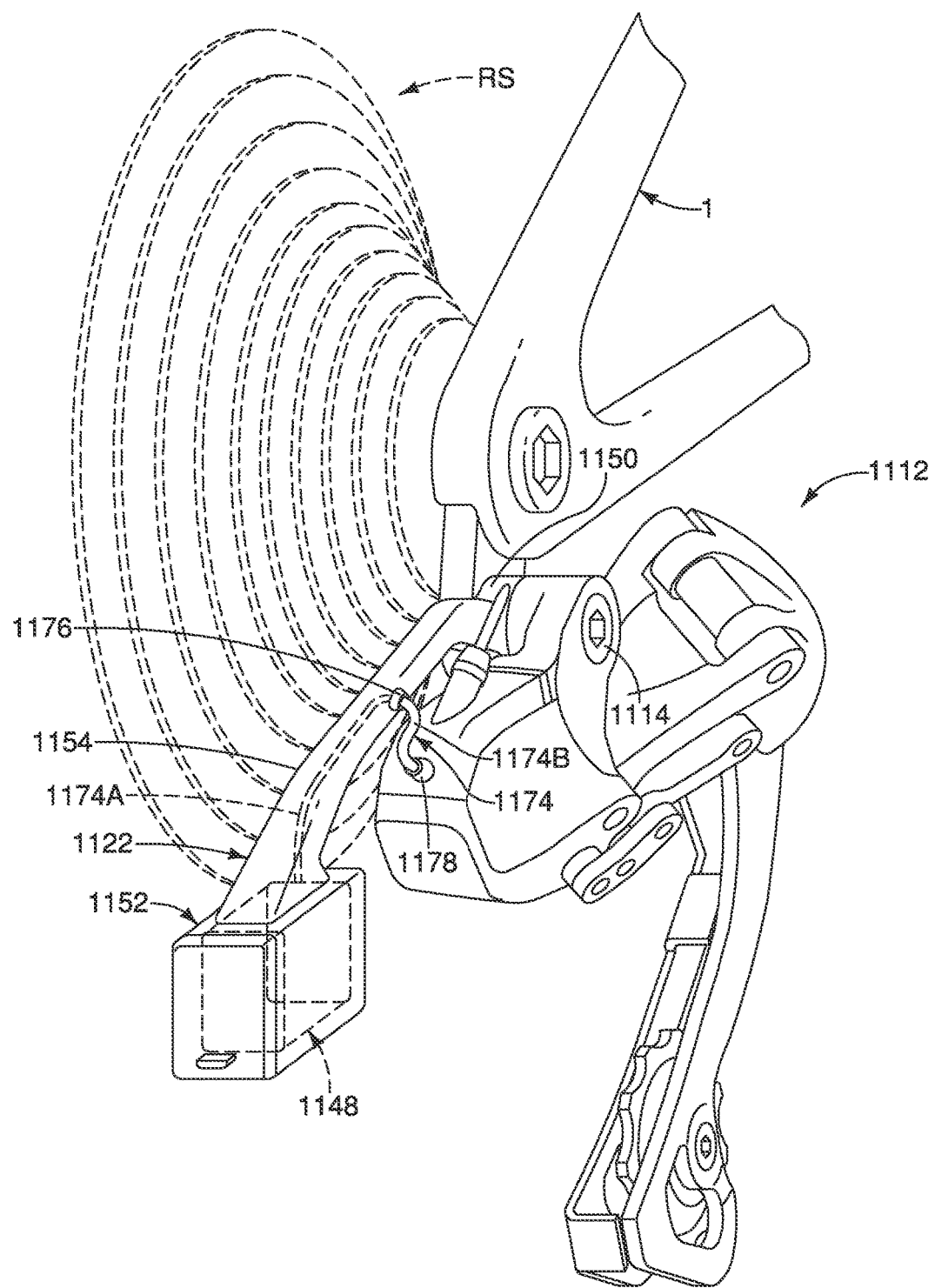
FIG. 28 is a rear perspective of a portion of a bicycle frame that is equipped with an electric bicycle rear derailleur in accordance with a third illustrated embodiment in which the rear derailleur has a battery mounted to the rear derailleur via an eleventh alternative battery bracket that supports the battery in a location that is primarily rearward and primarily below a base member of the rear derailleur while the rear derailleur is mounted to the bicycle frame.

Turning now to FIG. 28, an electric bicycle rear derailleur 1112 is illustrated in accordance with a third embodiment with an eleventh alternative battery bracket 1122 mounted to the rear derailleur 1112 using a fastener 1114. Here, the rear derailleur 1112 is identical to the rear derailleur 12 and the battery bracket 1122 is identical to the battery bracket 22, as discussed above, except that the power wire connection between the rear derailleur 1112 and the battery bracket 1122. Also the rear derailleur 1112 and the battery bracket 1122 are fixed to the frame 1 in the same manner as in the first embodiment. Accordingly, the following description of the rear derailleur 1112 and the battery bracket 1122 will only focus on the differences from the first embodiment.

The battery bracket 1122 includes a mounting part 1150, a battery receiving part 1152 and an arm part 1154. The battery receiving part 1152 is configured and dimensioned to support a battery 1148 therein. The battery 1148 is electrically connected to an electric motor unit of the rear derailleur 1112 by an electrical wire 1174. Here, a first portion 1174A of the electrical wire 1174 is embedded in the arm part 1154 of the battery bracket 1122. A second 1174B portion of the electrical wire 1174 is an external wire that extends between a first electrical connector 1176 and a second electrical connector 1178. The first electrical connector 1176 is either partially embedded in or attached to the arm part 1154 of the battery bracket 1122, while the second electrical connector 1178 is either partially embedded in or attached to a housing of the electric motor unit of the rear derailleur 1112.

This alternative wiring as shown in FIG. 28 can be implemented in each of the above discussed embodiments as needed and/or desired. Moreover, the power wire connection between the rear derailleur 1112 and the battery bracket 1122 can be completely hidden, if needed and/or desired. For example, the mounting part 1150 can be provided with electrical contacts that electrically contact corresponding electrical contacts provided on a mounting portion of the rear derailleur 1112.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the electric bicycle rear derailleur Accordingly, these directional terms, as utilized to describe the electric bicycle rear derailleur should be interpreted relative to a bicycle in an upright riding position on a horizontal surface and that is equipped with the electric bicycle rear derailleur . The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element, This definition also applies to words of similar meaning, for example, "joined", "connected", "coupled", "mounted", "bonded", "fixed" and their derivatives. "The term "detachably attached" or "detachably attaching", as used herein, encompasses configurations in which an element directly attached to another element by directly affixing the element to the other element while the element is detachable from the other element without damage; and configurations in which the element is indirectly attached to the other element via intermediate member(s) while the element is detachable from the other element and the intermediate member(s) without damage. This concept also applies to words of similar meaning, for example, "detachably joined", "detachably connected", "detachably coupled", "detachably mounted", "detachably bonded", "detachably fixed" and their derivatives." Also term "reattachably attached" or "reattachably attaching", as used herein, encompasses configurations in which an element directly attached to another element by directly affixing the element to the other element while the element is reattachable to the other element without damage; and configurations in which the element is indirectly attached to the other element via intermediate member(s) while the element is reattachable to the other element and the intermediate member(s) without damage. This concept also applies to words of similar meaning, for example, "reattachably joined", "reattachably connected", "reattachably coupled", "reattachably mounted", "reattachably bonded", "reattachably fixed" and their derivatives." Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. An electric bicycle rear derailleur comprising:
a base member;

a frame mounting structure configured to be attached to a bicycle frame;

a chain guide pivotally supported with respect to the base member between a retracted position and an extended position;

a linkage assembly operatively coupling the chain guide to the base member; and a battery bracket supported as a separate part on the base member by the frame mounting structure that attaches the battery bracket to the base member and the bicycle frame, the battery bracket configured to receive a battery.

2. The electric bicycle rear derailleur according to claim 1, further comprising the battery mounted on the battery bracket.

3. The electric bicycle rear derailleur according to claim 1, wherein the battery bracket is detachably and reattachably coupled to the base member.

4. The electric bicycle rear derailleur according to claim 1, wherein the battery bracket extends from a frame facing side of the base member, and supports the battery at a position with the battery disposed primarily rearward of the base member while the electric bicycle rear derailleur is mounted to a bicycle frame.

5. The electric bicycle rear derailleur according to claim 4, wherein the battery bracket further supports the battery primarily below the base member while the electric bicycle rear derailleur is mounted to a bicycle frame.

6. The electric bicycle rear derailleur according to claim 1, wherein the battery bracket extends from a frame facing side of the base member, and supports the battery at a position with the battery disposed primarily forward of the base member while the electric bicycle rear derailleur is mounted to a bicycle frame.

7. The electric bicycle rear derailleur according to claim 6, wherein the battery bracket further supports the battery primarily above the base member while the electric bicycle rear derailleur is mounted to a bicycle frame.

8. The electric bicycle rear derailleur according to claim 1, further comprising a derailleur bracket including a first attachment portion mounted to the base member, and a second attachment portion configured to be mounted to a bicycle frame.

9. The electric bicycle rear derailleur according to claim 8, wherein the battery bracket is disposed on the second attachment portion of the derailleur bracket.

10. The electric bicycle rear derailleur according to claim 8, wherein the battery bracket is disposed on the first attachment portion of the derailleur bracket.

11. The electric bicycle rear derailleur according to claim 1, wherein the battery bracket extends from a side opposite to a frame facing side of the base member, and supports the battery at a position with the battery disposed primarily rearward of the base member while the electric bicycle rear derailleur is mounted to a bicycle frame.

12. The electric bicycle rear derailleur according to claim 11, wherein the battery bracket further supports the battery primarily below the base member while the electric bicycle rear derailleur is mounted to a bicycle frame.

13. The electric bicycle rear derailleur according to claim 11, further comprising a derailleur bracket including a first attachment portion mounted to the base member, and a second attachment portion configured to be mounted to a bicycle frame.

14. The electric bicycle rear derailleur according to claim 1, wherein the battery bracket extends from a side opposite to a frame facing side of the base member, and supports the battery at a position with the battery disposed primarily forward of the base member while the electric bicycle rear derailleur is mounted to a bicycle frame.

15. The electric bicycle rear derailleur according to claim 14, wherein the battery bracket further supports the battery primarily above the base member while the electric bicycle rear derailleur is mounted to a bicycle frame.

16. The electric bicycle rear derailleur according to claim 14, further comprising a derailleur bracket including a first attachment portion mounted to the base member, and a second attachment portion configured to be mounted to a bicycle frame.

17. The electric bicycle rear derailleur according to claim 1, further comprising an electric motor unit disposed on the base member.

18. The electric bicycle rear derailleur according to claim 17, wherein the battery is electrically connected to the electric motor unit by an electrical wire.

19. The electric bicycle rear derailleur according to claim 18, wherein the electrical wire extends directly between the electric motor unit and the battery bracket.

20. The electric bicycle rear derailleur according to claim 18, wherein the electrical wire includes a wire terminal that mounted on the battery bracket and the battery includes a plug-in terminal that mates with the wire terminal.

21. The battery bracket according to claim 1, wherein the frame mounting structure is a fixing bolt that passes through a first opening in the base member and a second opening in the bicycle frame.

22. A electrical bicycle rear derailleur comprising:

a base member;

a chain guide pivotally supported with respect to the base member between a retracted position and an extended position;

a linkage assembly operatively coupling the chain guide to the base member; and a battery bracket supported as a separate part on the base member, the battery bracket configured to receive a battery, the battery bracket including a mounting part configured to be attached to the base member, a battery receiving part configured to receive the battery, and an arm part configured to connect the mounting part and the battery receiving part.

23. The electrical bicycle rear derailleur according to claim 22, wherein the arm part of the battery bracket is configured to maintain a relative position of the battery receiving part to the mounting part.

24. The electric bicycle rear derailleur according to claim 22, wherein
the arm part of the battery bracket includes a plurality of ball and socket joint connectors, the arm part configured to flexibly maintain a relative position of the battery receiving part to the mounting part.

25. A battery bracket comprising:
a first mounting portion configured to be detachably and reattachably mounted to one of a bicycle frame and a derailleur bracket; and
a second mounting portion configured to support a battery at a position with the battery disposed primarily rearward of the base member while the base member is mounted to the bicycle frame.

26. The battery bracket according to claim 25, wherein the second mounting portion is further configured to support the battery at a position disposed primarily below the base member while the electric bicycle rear derailleur is mounted to the bicycle frame.

* * * * *